(12) United States Patent
Choi

(10) Patent No.: US 10,921,864 B2
(45) Date of Patent: Feb. 16, 2021

(54) DISPLAY DEVICE

(71) Applicant: SAMSUNG DISPLAY CO., LTD., Yongin-si (KR)

(72) Inventor: Kyungmin Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/795,894

(22) Filed: Feb. 20, 2020

(65) Prior Publication Data
US 2020/0356145 A1 Nov. 12, 2020

(30) Foreign Application Priority Data

May 10, 2019 (KR) .................. 10-2019-0054610

(51) Int. Cl.
*G06F 1/16* (2006.01)
*G09F 9/30* (2006.01)

(52) U.S. Cl.
CPC .......... *G06F 1/1681* (2013.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,071,673 B2 * | 6/2015 | Choi | .................. | H04M 1/0247 |
| 9,179,559 B1 * | 11/2015 | Kim | .................. | G06F 1/1681 |
| 9,600,035 B2 * | 3/2017 | Park | .................. | G06F 1/1652 |
| 9,857,832 B2 * | 1/2018 | Kim | .................. | G06F 1/1679 |
| 9,923,156 B2 | 3/2018 | Jeong | | |
| 10,043,421 B2 * | 8/2018 | Koo | .................. | G06F 1/1652 |
| 10,082,827 B2 * | 9/2018 | Yamauchi | .................. | G06F 1/1681 |
| 10,133,303 B2 * | 11/2018 | Park | .................. | G06F 1/1652 |
| 10,185,355 B2 * | 1/2019 | Watamura | .................. | G06F 1/1641 |
| 10,362,696 B2 | 7/2019 | Ahn | | |
| 10,379,573 B2 * | 8/2019 | Park | .................. | G06F 1/1677 |
| 10,383,239 B2 | 8/2019 | Lee et al. | | |
| 10,481,634 B2 * | 11/2019 | Mizoguchi | .................. | G06F 1/1637 |
| 10,678,428 B2 * | 6/2020 | Kim | .................. | G06F 3/0482 |
| 2009/0167171 A1 | 7/2009 | Jung et al. | | |
| 2010/0201604 A1 | 8/2010 | Kee et al. | | |
| 2015/0230349 A1 | 8/2015 | Lee et al. | | |
| 2017/0345874 A1 | 11/2017 | Kim et al. | | |
| 2018/0352924 A1 * | 12/2018 | Lim | .................. | H04B 1/3888 |
| 2019/0320048 A1 * | 10/2019 | Yang | .................. | G06F 1/1658 |
| 2019/0339745 A1 * | 11/2019 | Chen | .................. | G06F 1/1681 |

(Continued)

FOREIGN PATENT DOCUMENTS

| | | |
|---|---|---|
| CN | 109686251 A | 4/2019 |
| KR | 1020100009910 A | 1/2010 |

(Continued)

OTHER PUBLICATIONS

Extended European Search Report for application No. 20173287.2 dated Sep. 7, 2020.

*Primary Examiner* — Lisa Lea-Edmonds
(74) *Attorney, Agent, or Firm* — Cantor Colburn LLP

(57) ABSTRACT

A display device includes a panel support portion including a plurality of support portions rotatably connected to each other, a flexible display panel on a first surface of the panel support portion, and a first protection portion rotatably connected to a side of the panel support portion.

44 Claims, 24 Drawing Sheets

(56) References Cited

U.S. PATENT DOCUMENTS

2020/0203458 A1    6/2020   Jin et al.
2020/0275563 A1*  8/2020   Watamura ................. E05D 3/14
2020/0285275 A1*  9/2020   Park ...................... G06F 1/1677

FOREIGN PATENT DOCUMENTS

| KR | 1020120094676 A | 8/2012 |
| KR | 1020170012739 A | 2/2017 |
| KR | 101800214 B1 | 11/2017 |
| KR | 1020170136052 A | 12/2017 |
| KR | 1020180030435 A | 3/2018 |
| WO | 2008054206 A2 | 5/2008 |

\* cited by examiner

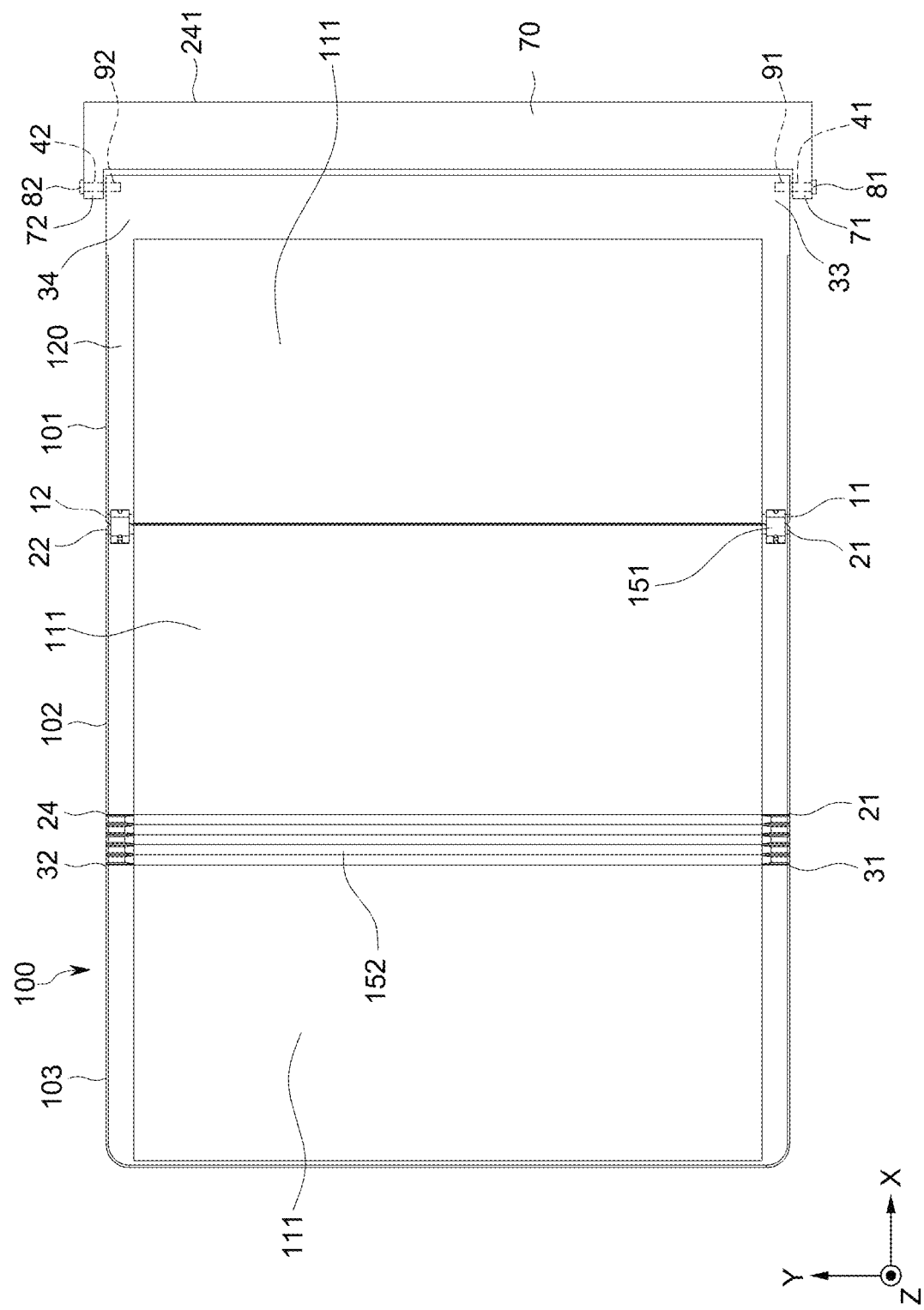

DISPLAY DEVICE

This application claims priority to Korean Patent Application No. 10-2019-0054610, filed on May 10, 2019, and all the benefits accruing therefrom under 35 U.S.C. § 119, the content of which in its entirety is herein incorporated by reference.

1. FIELD

Exemplary embodiments of the invention relate to a display device, and more particularly, to a display device capable of substantially preventing damage to a display panel.

2. DISCUSSION OF RELATED ART

A deformable display device such as a flexible or foldable display device generally includes a display panel that may be bendable.

SUMMARY

Since a curved portion of a display panel is more stressed than another portion thereof, the curved portion may be vulnerable to an impact from an outside.

Exemplary embodiments of the invention may be directed to a display device capable of substantially preventing damage to a display panel.

An exemplary embodiment provides a display device including a panel support portion including a plurality of support portions rotatably connected to each other, a flexible display panel on a first surface of the panel support portion, and a first protection portion rotatably connected to a side of the panel support portion.

In an exemplary embodiment, the first protection portion may not contact a non-display surface of the flexible display panel.

In an exemplary embodiment, the panel support portion may further include a first support portion rotatably connected to the first protection portion, a second support portion rotatably connected to the first support portion, and a third support portion rotatably connected to the second support portion.

In an exemplary embodiment, the first protection portion may be connected to the first support portion in a rotatable manner by a degree in a range from about 80 degrees to about 190 degrees.

In an exemplary embodiment, when an angle between the first protection portion and the first support portion is less than about 180 degrees, the first protection portion may face a display surface of the flexible display panel between the second support portion and the third support portion.

In an exemplary embodiment, a rotation shaft of the first protection portion may be substantially parallel to a rotation shaft between the first support portion and the second support portion.

In an exemplary embodiment, a rotation shaft between the first support portion and the second support portion may be substantially parallel to a rotation shaft between the second support portion and the third support portion.

In an exemplary embodiment, the first support portion and the second support portion may rotate such that a first surface of the first support portion and a second surface of the second support portion face each other.

In an exemplary embodiment, the second support portion and the third support portion may rotate such that a second surface of the second support portion and a second surface of the third support portion face each other, or such that a first surface of the second support portion and a first surface of the third support portion face each other.

In an exemplary embodiment, a first edge of first and second edges, facing each other, of the first support portion may be rotatably connected to the second support portion, and the second edge is rotatably connected to the first protection portion.

In an exemplary embodiment, the first protection portion may extend along the second edge.

In an exemplary embodiment, the first protection portion may have a thickness that increases, as further away from the first support portion.

In an exemplary embodiment, a surface of the first support portion may have a rounded shape.

In an exemplary embodiment, at least a part of a surface of the first protection portion may have a curvature substantially the same as a curvature of a curved portion of the flexible display panel.

In an exemplary embodiment, when an angle between the first protection portion and the first support portion is about 90 degrees, the first protection portion may not expose a curved portion of the flexible display panel.

In an exemplary embodiment, when an angle between the first protection portion and the first support portion is about 90 degrees, the first protection portion may contact a curved portion of the flexible display panel.

In an exemplary embodiment, the first protection portion may include a protection plate, and an extension portion extending from the protection plate and disposed between a first connection portion and a second connection portion of the first support portion. The protection plate, the first connection portion and the second connection portion may be connected to each other by a rotation shaft.

In an exemplary embodiment, the first protection portion may include a protection plate, a first extension portion extending from a first edge of the protection plate and disposed outside a first connection portion of the first support portion, and a second extension portion extending from a second edge of the protection plate and disposed outside a second connection portion of the first support portion. The protection plate and the first extension portion may be connected to each other by a first rotation shaft, and the protection plate and the second extension portion are connected to each other by a second rotation shaft.

In an exemplary embodiment, the first protection portion may include a transparent material.

In an exemplary embodiment, the display device may further include a buffer portion at an inner side surface of the first protection portion.

In an exemplary embodiment, the buffer portion may be disposed over an entire surface of the inner side surface of the first protection portion.

In an exemplary embodiment, the buffer portion may be disposed at opposite edges of the inner side surface of the first protection portion.

In an exemplary embodiment, the display device may further include an auxiliary display panel on at least one of an inner side surface and an outer side surface of the first protection portion.

In an exemplary embodiment, the display device may further include a mode determination sensor on at least one of an inner side surface and an outer side surface of the first protection portion.

In an exemplary embodiment, the display device may further include a fingerprint sensor disposed on at least one of an inner side surface and an outer side surface of the first protection portion.

In an exemplary embodiment, the display device may further include a physical manipulation unit on at least one of an inner side surface and an outer side surface of the first protection portion.

In an exemplary embodiment, the display device may further include an imaging unit on at least one of an inner side surface and an outer side surface of the first protection portion.

In an exemplary embodiment, the display device may further include a lighting unit on at least one of an inner side surface and an outer side surface of the first protection portion.

In an exemplary embodiment, the display device may further include a second protection portion rotatably connected to the first protection portion.

In an exemplary embodiment, the second protection portion may be disposed on the third support portion.

In an exemplary embodiment, the second protection portion may include a transparent or translucent material.

In an exemplary embodiment, the display device may further include a third protection portion rotatably connected to the third support portion.

In an exemplary embodiment, an angle between an inner side surface of the third protection portion and a rear surface of the third support portion may be in a range from about 80 degrees to about 190 degrees.

In an exemplary embodiment, the display device may further include a first hinge portion connecting the first support portion and the second support portion.

In an exemplary embodiment, the first hinge portion may include a first plate, a first coupling portion protruding from a first edge of the first plate, and connected to a first connection portion of the first support portion and a first connection portion of the second support portion, and a second coupling portion protruding from a second edge of the first plate, and connected to a second connection portion of the first support portion and a second connection portion of the second support portion.

In an exemplary embodiment, the first coupling portion may include a first rotation shaft connected to the first connection portion of the first support portion, a second rotation shaft connected to the first connection portion of the second support portion, and a plurality of gears connected to the first rotation shaft and the second rotation shaft.

In an exemplary embodiment, the second coupling portion may include a third rotation shaft connected to the second connection portion of the first support portion, a fourth rotation shaft connected to the second connection portion of the second support portion, and a plurality of gears connected to the third rotation shaft and the fourth rotation shaft.

In an exemplary embodiment, the display device may further include a second hinge portion connecting the second support portion and the third support portion.

In an exemplary embodiment, the second hinge portion may include a plurality of joint portions hingedly coupled between the second support portion and the third support portion.

An exemplary embodiment provides a display device including a panel support portion including a first support portion, a second support portion rotatably connected to the first support portion, and a third support portion rotatably connected to the second support portion, a flexible display panel on the panel support portion, and a protection portion rotatably connected to the first support portion.

In an exemplary embodiment, the protection portion may not contact a non-display surface of the flexible display panel.

In an exemplary embodiment, the protection portion may be connected to the first support portion in a rotatable manner by a degree in a range from about 80 degrees to about 190 degrees.

In an exemplary embodiment, when an angle between the protection portion and the first support portion is less than about 180 degrees, the protection portion may face a display surface of the flexible display panel between the second support portion and the third support portion.

An exemplary embodiment provides a display device including a panel support portion including 'n' number of support portions of which adjacent ones are connected to each other where 'n' is a natural number greater than two, a flexible display panel on the panel support portion, and a protection portion rotatably connected to a support portion that is disposed at an outermost position among the 'n' number of support portions.

In an exemplary embodiment, the protection portion may not contact a non-display surface of the flexible display panel.

The foregoing is illustrative only and is not intended to be in any way limiting. In addition to the illustrative exemplary embodiments, embodiments and features described above, further exemplary embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, in which:

FIG. 31 is a view illustrating another exemplary embodiment of a display device.

DETAILED DESCRIPTION

Figure 1:
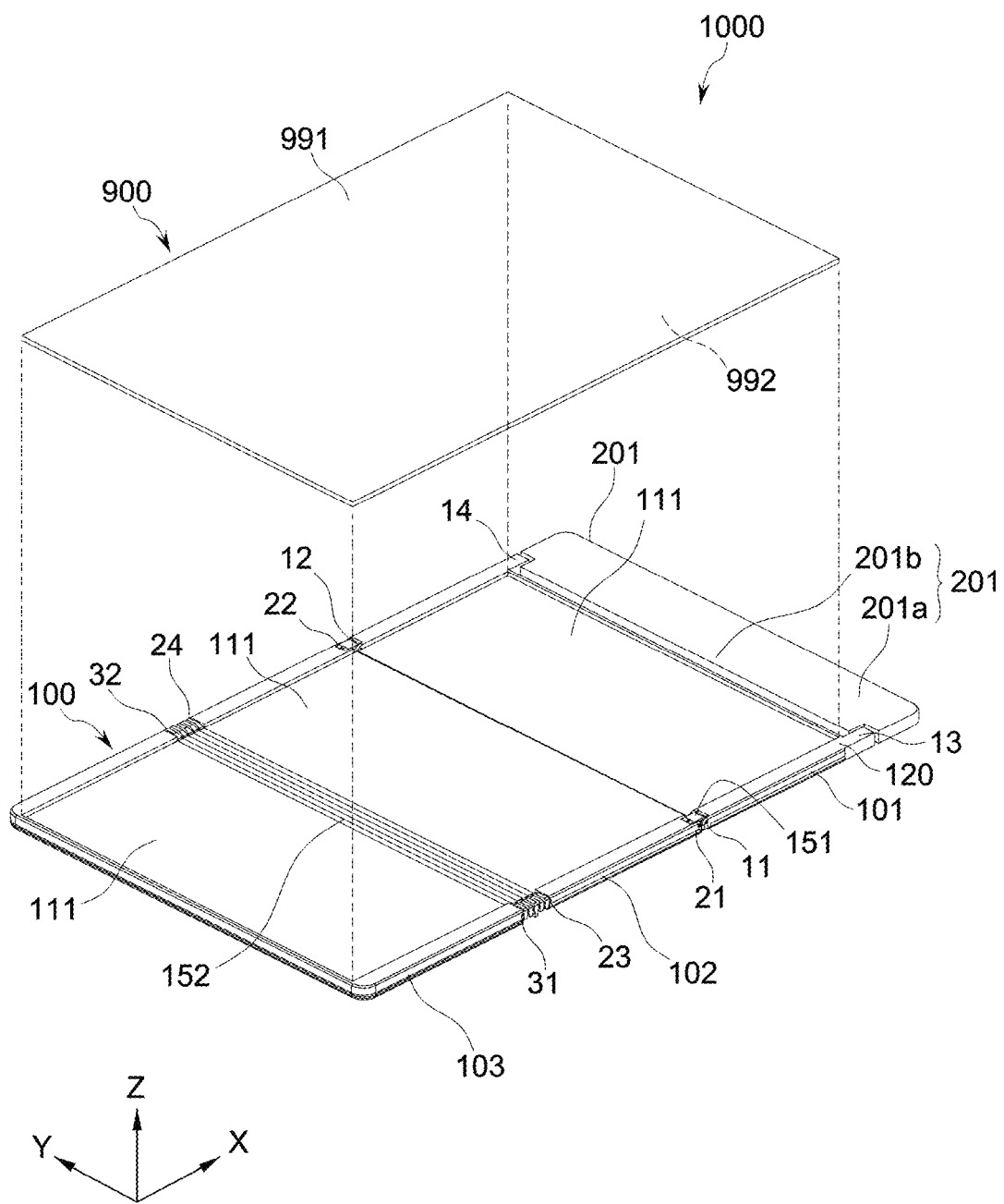
FIG. 1 is a perspective view illustrating an exemplary embodiment of a display device.

Exemplary embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the exemplary embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device located "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises", "including", "includes" and/or "including", when used in this specification, specify the presence of stated features, integers, steps, operations, elements and/or components, but do not preclude the presence or addition of one or more other features, integers, steps, operations, elements, components and/or groups thereof.

It will be understood that, although the terms "first", "second", "third", and the like may be used herein to describe various elements, these elements should not be limited by these terms. These terms are only used to distinguish one element from another element. Thus, "a first element" discussed below could be termed "a second element" or "a third element", and "a second element" and "a third element" may be termed likewise without departing from the teachings herein.

"About" or "approximately" as used herein is inclusive of the stated value and means within an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Some of the parts which are not associated with the description may not be provided in order to in specific describe embodiments of the invention and like reference numerals refer to like elements throughout the specification.

Hereinafter, an exemplary embodiment of a display device will be described with reference to FIGS. 1 to 31.

Figure 2:
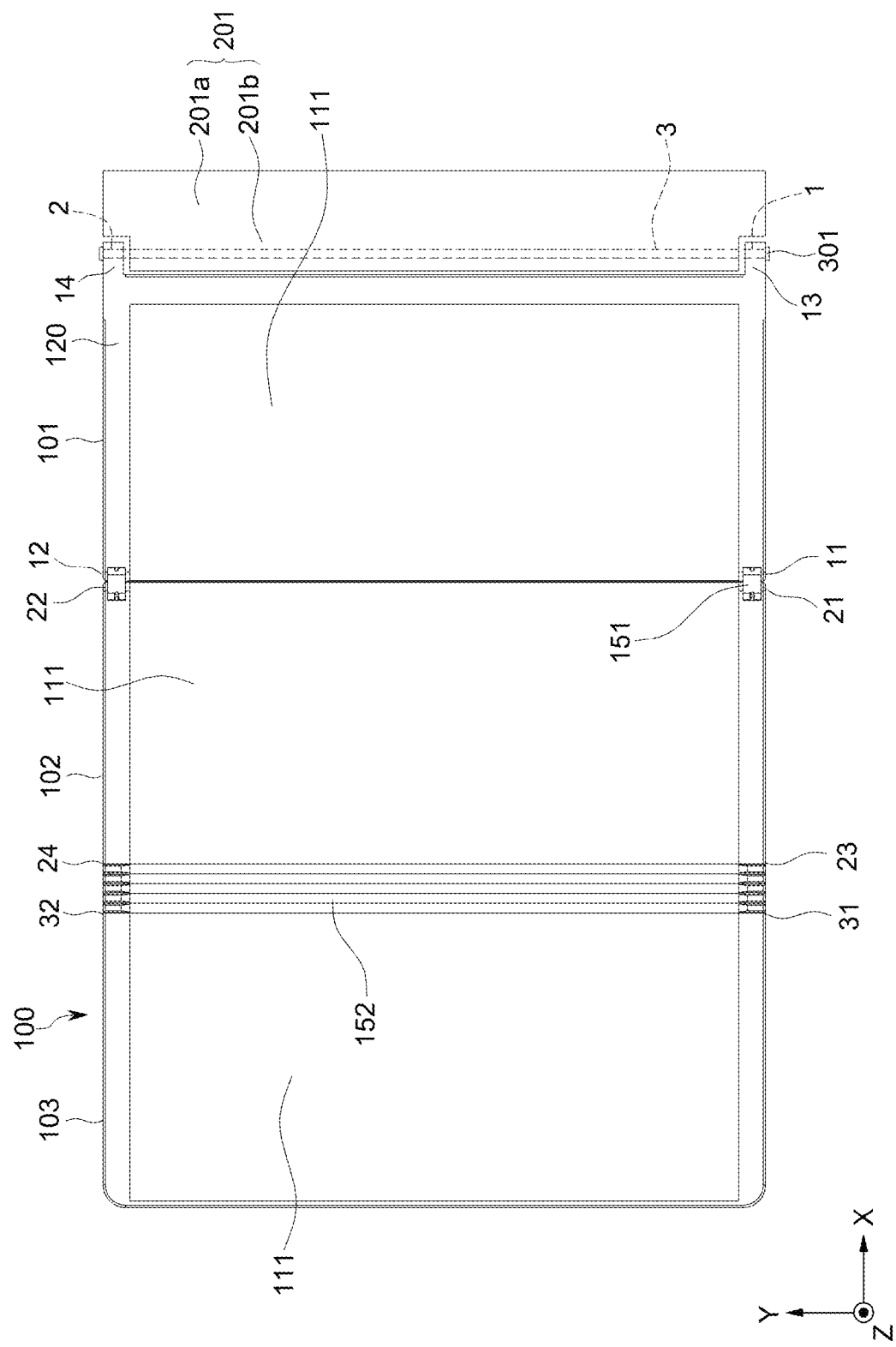
FIG. 2 is a view illustrating a front surface of FIG. 1.
Figure 3:
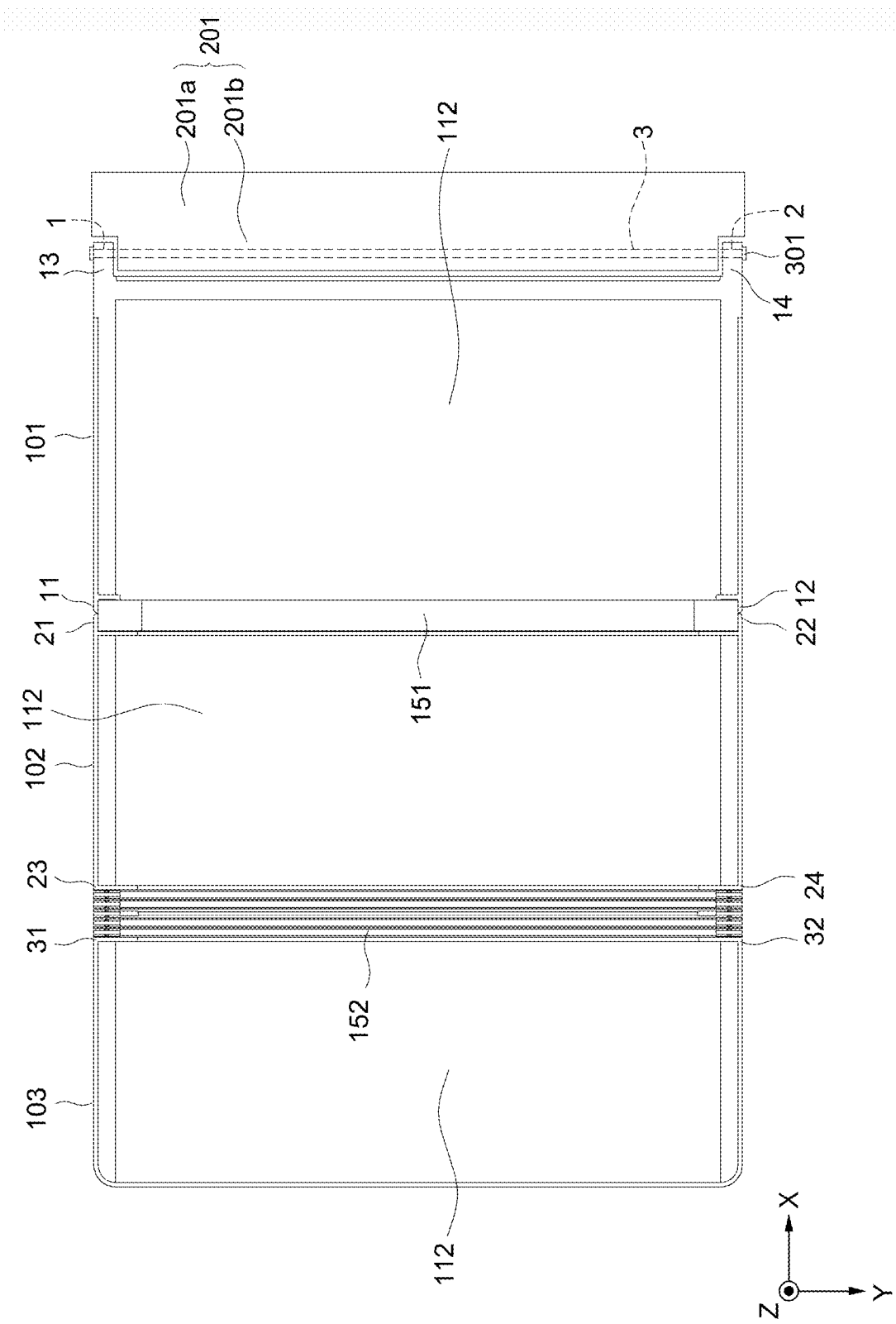
FIG. 3 is a view illustrating a rear surface of FIG. 1.

FIG. 1 is a perspective view illustrating an exemplary embodiment of a display device, FIG. 2 is a view illustrating a front surface of FIG. 1, and FIG. 3 is a view illustrating a rear surface of FIG. 1.

A display device 1000 in an exemplary embodiment may include a panel support portion 100, a display panel 900, and a first protection portion 201, as illustrated in FIGS. 1 to 3. In such an exemplary embodiment, the panel support portion 100 may include a plurality of support portions 101, 102, and 103 and a plurality of hinge portions 151 and 152.

The panel support portion 100 may further include a support surface 111 and a protrusion 120 disposed at an edge of the support surface 111. The protrusion 120 may protrude along a Z-axis direction from the edge of the support surface 111. A height of the protrusion 120 is higher than a height of the support surface 111. In such an exemplary embodiment, the height of the protrusion 120 and the height of the support surface 111 refer to the lengths in the Z-axis direction.

The plurality of support portions 101, 102, and 103 may include a first support portion 101, a second support portion 102, and a third support portion 103. As illustrated in FIG. 1, when the panel support portion 100 is fully unfolded, the second support portion 102 may be disposed between the first support portion 101 and the third support portion 103.

The protrusion 120 on the first support portion 101 is not connected to the protrusion 120 on the second support portion 102 and the protrusion 120 on the third support portion 103, the protrusion 120 on the second support portion 102 is not connected to the protrusion 120 on the first support portion 101 and the protrusion 120 on the third support portion 103, and the protrusion 120 on the third support portion 103 is not connected to the protrusion 120 on the first support portion 101 and the protrusion 120 on the second support portion 102. In other words, the protrusions 120 on different support portions are separated from each other.

As illustrated in the example illustrated in FIG. 1, the protrusion 120 on the first support portion 101 may have a shape similar to "]", the protrusion 120 on the second support portion 102 may have a shape similar to "=", and the protrusion 120 on the third support portion 103 may have a shape similar to "[". That is, in the illustrated exemplary embodiment, the protrusion 120 on the first support portion 101 may include upper and lower portions extending in the X direction and facing each other and a right side portion connecting the upper and lower portions, the protrusion 120 on the second support portion 102 may include upper and lower portions extending in the X direction and facing each other, and the protrusion 120 on the third support portion 103 may include upper and lower portions extending in the X direction and facing each other and a left side portion connecting the upper and lower portions.

Adjacent ones of the support portions 101, 102, and 103 are rotatably connected to each other. To this end, the adjacent ones of the support portions 101, 102, and 103 may be hingedly coupled to each other by hinge portions 151 and 152 disposed therebetween.

The plurality of hinge portions 151 and 152 may include a first hinge portion 151 and a second hinge portion 152. The number of hinge portions may be one less than the number of support portions. In an exemplary embodiment, when the panel support portion 100 includes three support portions, the panel support portion 100 may include two hinge portions, for example.

The hinge portions 151 and 152 may be disposed between adjacent ones of the support portions 101, 102 and 103. In an exemplary embodiment, the first hinge portion 151 may be disposed between the first support portion 101 and the second support portion 102 disposed adjacent to each other, and the second hinge portion 152 may be disposed between the second support portion 102 and the third support portion 103 adjacent to each other, for example.

The first support portion 101 is connected to the first hinge portion 151, the second support portion 102 is connected to the first hinge portion 151 and the second hinge portion 152, and the third support portion 103 is connected to the second hinge portion 152. In an exemplary embodiment, a first connection portion 11 and a second connection portion 12 of the first support portion 101 are rotatably connected to the first hinge portion 151, a first connection portion 21 and a second connection portion 22 of the second support portion 102 are rotatably connected to the first hinge portion 151, a third connection portion 23 and a fourth connection portion 24 of the second support portion 102 are rotatably connected to the second hinge portion 152, and a first connection portion 31 and a second connection portion 32 of the third support portion 103 are rotatably connected to the second hinge portion 152, for example.

The first, second, and third support portions 101, 102, and 103 may rotate by a predetermined angle with reference to the first and second hinge portions 151 and 152. In an exemplary embodiment, the first support portion 101 may rotate about 180 degrees with respect to the first hinge portion 151 as an axis, and the third support portion 103 may rotate about 360 degrees with respect to the second hinge portion 152 as an axis, for example.

The first support portion 101 is rotatable toward the support surface 111 of the second support portion 102. In other words, the first support portion 101 is in-foldable toward the support surface 111 of the second support portion 102. In an exemplary embodiment, the second support portion 102 may not be able to rotate toward a rear surface 112 of the first support portion 101. However, the second support portion 102 may be rotatable toward a rear surface 112 of the third support portion 103.

The third support portion 103 is rotatable toward the support surface 111 of the second support portion 102 or a rear surface 112 of the second support portion 102. In other words, the third support portion 103 is in-foldable toward the support surface 111 of the second support portion 102 and is also out-foldable toward the rear surface 112 of the second support portion 102.

A rotation shaft of the first hinge portion 151 and a rotation shaft of the second hinge portion 152 may be substantially parallel to each other. In addition, a rotation shaft of the first protection portion 201 may be substantially parallel to at least one of the rotation shaft of the first hinge portion 151 and the rotation shaft of the second hinge portion 152.

The display panel 900 is disposed on the panel support portion 100. In an exemplary embodiment, the display panel 900 may be disposed on the support surface 111 of the panel support portion 100, for example. More specifically, the display panel 900 may be disposed on the respective support surfaces 111 of the first support portion 101, the second support portion 102, and the third support portion 103. A non-display surface 992 of the display panel 900 may contact respective support surfaces 111 of the first support portion 101, the second support portion 102, and the third support portion 103. In addition, the display panel 900 may also be disposed on the first hinge portion 151 and the second hinge portion 152, and in such an exemplary embodiment, the non-display surface 992 of the display panel 900 may contact the first hinge portion 151 and the second hinge portion 152. In an exemplary embodiment, the non-display surface 992 of the display panel 900 does not contact the first protection portion 201.

The support surface 111 of the panel support portion 100 faces the non-display surface 992 of the display panel 900. The non-display surface 992 of the display panel 900 faces a display surface 991 of the display panel 900. The display panel 900 provides an image through the display surface 991. The non-display surface 992 of the display panel 900 may be disposed between the display surface 991 of the display panel 900 and the support surface 111 of the panel support portion 100. The display panel 900 disposed on the support surface 111 of the panel support portion 100 may be enclosed by the protrusion 120 of the panel support portion 100.

The display panel 900 may be a flexible display panel 900 or a foldable display panel 900. In such an exemplary embodiment, the display panel 900 may be a light emitting display panel 900 or a liquid crystal display panel 900. In such an exemplary embodiment, the light emitting display panel 900 may be an organic light emitting diode ("OLED") display panel 900.

The first protection portion 201 may be connected to any one of the plurality of support portions. In an exemplary embodiment, when the panel support portion 100 is fully unfolded as illustrated in FIGS. 1 and 2, the first protection portion 201 may be connected to the first support portion 101 which is disposed at one outermost position of the panel support portion of the plurality of support portions 101, 102, and 103, for example. In such an exemplary embodiment, the first protection portion 201 may be rotatably connected to the first support portion 101. In an exemplary embodiment, when one surface of the first support portion 101 connected to the first hinge portion 151 is defined as a first side surface, and another surface of the first support portion 101 that faces the first side surface of the first support portion 101 is defined as a second side surface, the first protection portion 201 may be rotatably connected to the second side surface of the first support portion 101, for example.

The first support portion 101 may include a first connection portion 13 and a second connection portion 14 which protrude from the second side surface of the first support portion 101 toward the first protection portion 201. As illustrated in FIG. 2, the first protection portion 201 may be connected to the first connection portion 13 and the second connection portion 14 through a connection shaft 301. The first connection portion 13 and the second connection portion 14 have through holes 1 and 2, respectively. A through hole 1 of the first connection portion 13 and a through hole 2 of the second connection portion 14 may face each other in a Y-axis direction. The through hole 1 of the first connection portion 13 penetrates the first connection portion 13 in the Y-axis direction, and the through hole 2 of the second connection portion 14 penetrates the second connection portion 14 in the Y-axis direction.

The first protection portion 201 may include, for example, a protection plate 201a and an extension portion 201b extending from the protection plate 201a. The extension portion 201b may be disposed between the first connection portion 13 and the second connection portion 14. The extension portion 201b of the first protection portion 201 has a through hole 3. The through hole 3 penetrates the extension portion 201b in the Y-axis direction. The connection shaft 301 described above is inserted into the through hole 1 of the first connection portion 13, the through hole 2 of the first protection portion 201, and the through hole 3 of the second connection portion 14. The first protection portion 201 is rotatably coupled to the connection shaft 301.

In an exemplary embodiment, the first protection portion 201 may include, for example, a transparent material.

The first protection portion 201 may protect the second hinge portion 152 and a display panel portion (e.g., a second curved portion (900b in FIG. 11) of the display panel) on the second hinge portion 152. Detailed description thereof will be described below.

Figure 4:
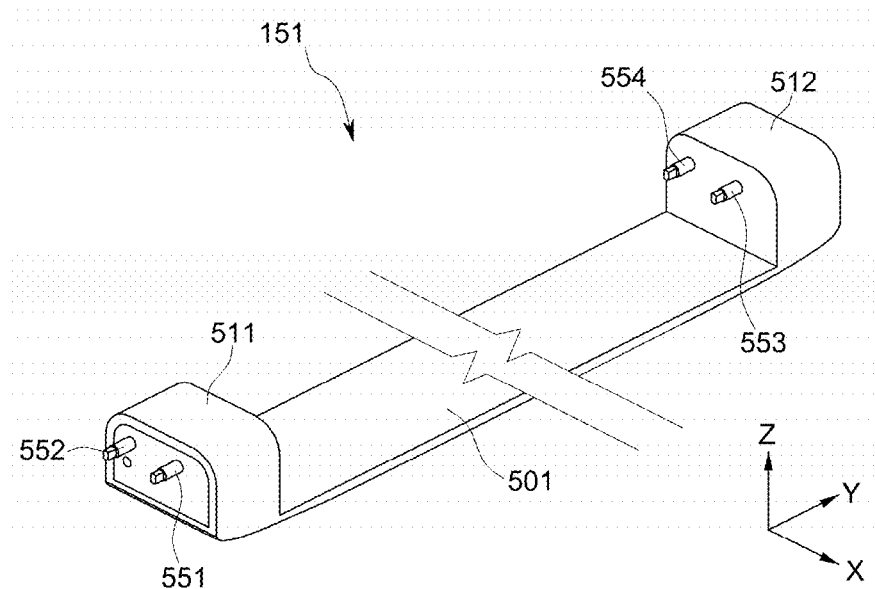
FIG. 4 is a perspective view illustrating a first hinge portion of FIG. 1.
Figure 5:
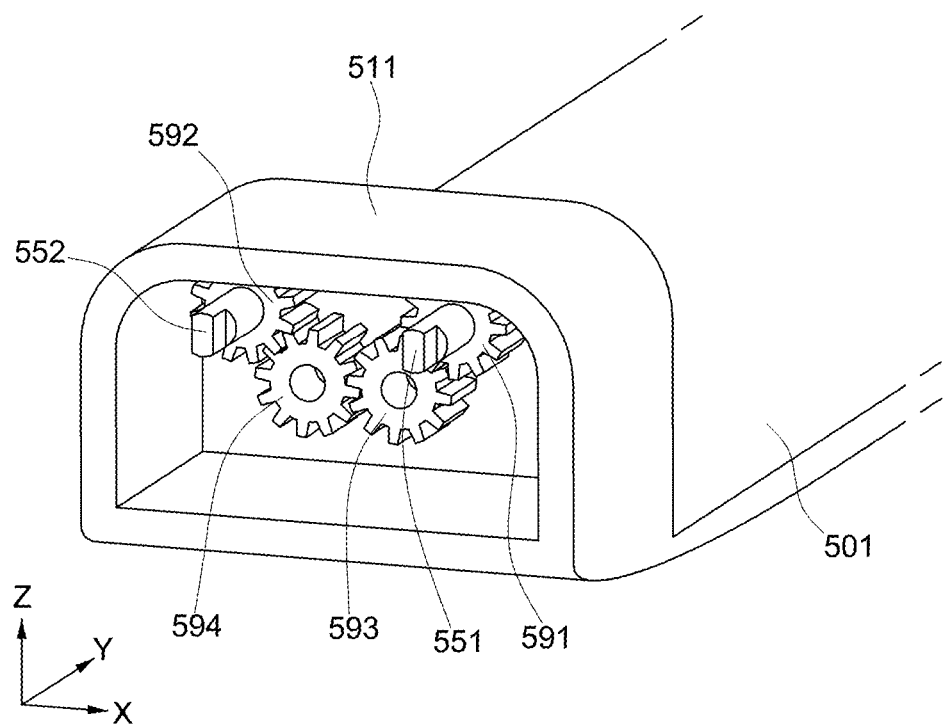
FIG. 5 is a view illustrating a coupling relationship between the first hinge portion and support portions of FIG. 4.

FIG. 4 is a perspective view illustrating the first hinge portion 151 of FIG. 1, and FIG. 5 is a detailed configuration view illustrating the first hinge portion 151 of FIG. 4.

As illustrated in FIG. 4, the first hinge portion 151 may include a first plate 501, a first coupling portion 511, and a second coupling portion 512.

The first coupling portion 511 may protrude in the Z-axis direction from one edge of the first plate 501. The first support portion 101 and the second support portion 102, described above, may be rotatably connected to the first coupling portion 511. In an exemplary embodiment, the first connection portion 11 of the first support portion 101 and the first connection portion 21 of the second support portion 102 may be rotatably connected to the first coupling portion 511, for example.

The first coupling portion 511 may include a first rotation shaft 551 and a second rotation shaft 552. The first rotation shaft 551 and the second rotation shaft 552 extend along a Y-axis direction. The first rotation shaft 551 and the second rotation shaft 552 are exposed to the outside of the first coupling portion 511 through holes of the first coupling portion 511, respectively. In such an exemplary embodiment, the first rotation shaft 551 and the second rotation shaft 552 are exposed to the outside through opposite surfaces of the first coupling portion 511 that face each other in the Y-axis direction.

The first rotation shaft 551 is connected to the first connection portion 11 of the first support portion 101. In an exemplary embodiment, the first rotation shaft 551 may be inserted into a coupling hole of the first connection portion 11 of the first support portion 101, for example. In an exemplary embodiment, an end portion of the first rotation shaft 551 and the coupling hole of the first connection portion 11 connected to the end portion may each have a quadrangular shape, for example.

The second rotation shaft 552 is connected to the first connection portion 21 of the second support portion 102. In an exemplary embodiment, the second rotation shaft 552 may be inserted into a coupling hole of the second connection portion 21 of the second support portion 102, for example. In an exemplary embodiment, an end portion of the second rotation shaft 552 and the coupling hole of the second connection portion 21 connected to the end portion may each have a quadrangular shape.

In addition, as illustrated in FIG. 5, the first coupling portion 511 may include a first gear 591, a second gear 592, a third gear 593, and a fourth gear 594. The first gear 591, the second gear 592, the third gear 593, and the fourth gear 594 may be disposed at an accommodation space provided in the first coupling portion 511. The first gear 591 and the second gear 592 are spaced apart from each other at an upper position of the accommodation space, and the third gear 593 and the fourth gear 594 are disposed at a lower position of the accommodation space. In such an exemplary embodiment, the third gear 593 is disposed below the first gear 591, and the fourth gear 594 is disposed below the second gear 592.

A shaft of the first gear 591 may be connected to the first rotation shaft 551 described above, and a shaft of the second gear 592 may be connected to the second rotation shaft 552 described above. In an exemplary embodiment, the shaft of the first gear 591 may be unitary with the first rotation shaft 551, and the shaft of the second gear 592 may be unitary with the second rotation shaft 552, for example.

The first gear 591 is connected to the third gear 593, the third gear 593 is connected to the fourth gear 594, and the fourth gear 594 is connected to the second gear 592. In other words, the first gear 591 is engagingly connected to the third gear 593, the third gear 593 is engagingly connected to the fourth gear 594, and the fourth gear 594 is engagingly connected to the second gear 592. In an exemplary embodiment, each of the shaft of the third gear 593 and the shaft of the fourth gear 594 is rotatably coupled to the first coupling portion 511.

When the first gear 591 rotates, the third gear 593 engaged with the first gear 591 rotates, when the third gear 593 rotates, the fourth gear 594 engaged with the third gear 593 rotates, and when the fourth gear 594 rotates, the second gear 592 engaged with the fourth gear 594 rotates. The first gear 591 and the fourth gear 594 rotate in substantially the same direction, and the second gear 592 and the third gear 593 rotate in substantially the same direction. The first gear 591 and the second gear 592 rotate in opposite directions, and the third gear 593 and the fourth gear 594 rotate in opposite directions.

As illustrated in FIG. 4, the second coupling portion 512 may protrude in the Z-axis direction from another edge of the first plate 501. The first support portion 101 and the second support portion 102 described above may be rotatably connected to the second coupling portion 512. In an exemplary embodiment, the second connection portion 12 of the first support portion 101 and the second connection portion 22 of the second support portion 102 may be rotatably connected to the second coupling portion 512, for example.

The second coupling portion 512 may include a third rotation shaft 553 and a fourth rotation shaft 554. The third rotation shaft 553 and the fourth rotation shaft 554 extend along the Y-axis direction. The third rotation shaft 553 and the fourth rotation shaft 554 are exposed to the outside of the second coupling portion 512 through holes of the second coupling portion 512, respectively. In such an exemplary embodiment, the third rotation shaft 553 and the fourth rotation shaft 554 are exposed to the outside through opposite surfaces of the second coupling portion 512 that face each other in the Y-axis direction.

The third rotation shaft 553 is connected to the second connection portion 12 of the first support portion 101. In an exemplary embodiment, the third rotation shaft 553 may be inserted into a coupling hole of the second connection portion 12 of the first support portion 101, for example. In an exemplary embodiment, an end portion of the third rotation shaft 553 and the coupling hole of the second connection portion 12 connected to the end portion may each have a quadrangular shape.

The fourth rotation shaft 554 is connected to the second connection portion 22 of the second support portion 102. In an exemplary embodiment, the fourth rotation shaft 554 may be inserted into a coupling hole of the second connection portion 22 of the second support portion 102, for example. In an exemplary embodiment, an end portion of the fourth rotation shaft 554 and the coupling hole of the second connection portion 22 connected to the end portion may each have a quadrangular shape.

Although not illustrated, the second coupling portion 512 may include the first, second, third, and fourth gears 591, 592, 593, and 594 described above. A shaft of the first gear 591 included in the second coupling portion 512 may be connected to the third rotation shaft 553, and a shaft of the second gear 592 included in the second coupling portion 512 may be connected to the fourth rotation shaft 554.

Figure 6:
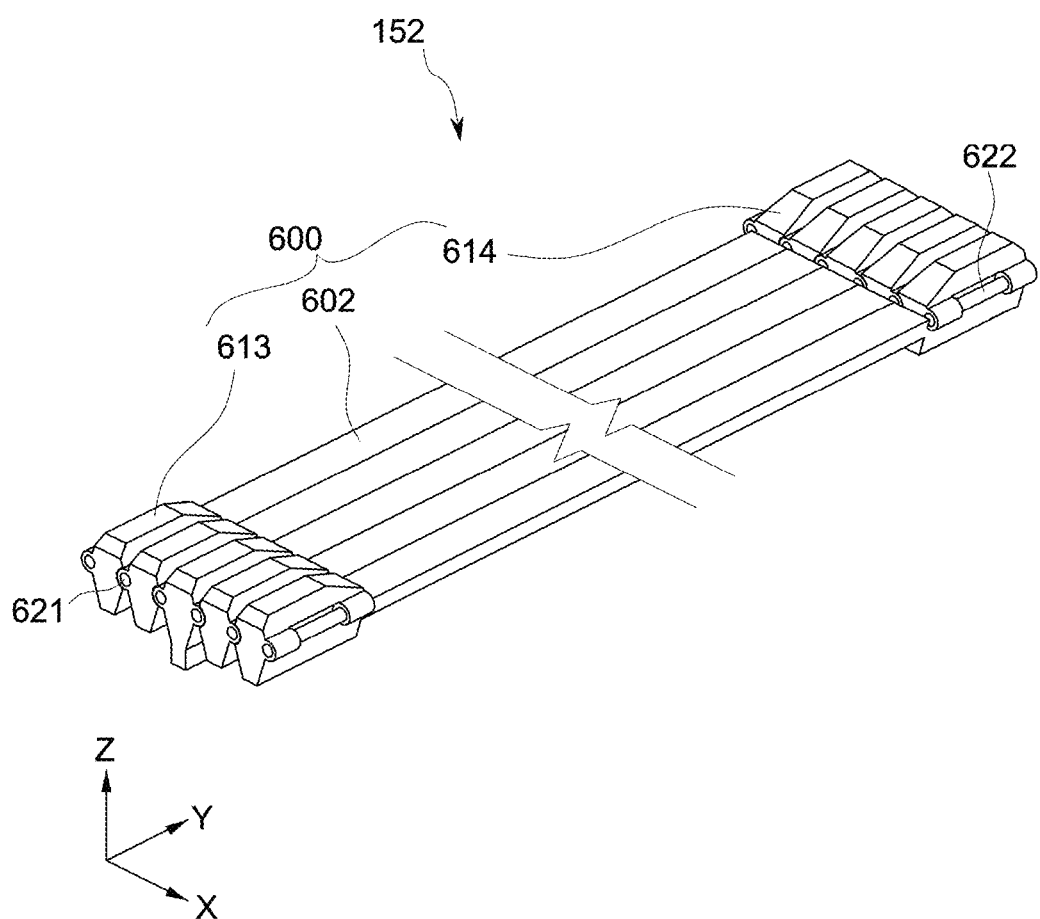
FIG. 6 is a perspective view illustrating a joint portion of FIG. 4.
Figure 7:
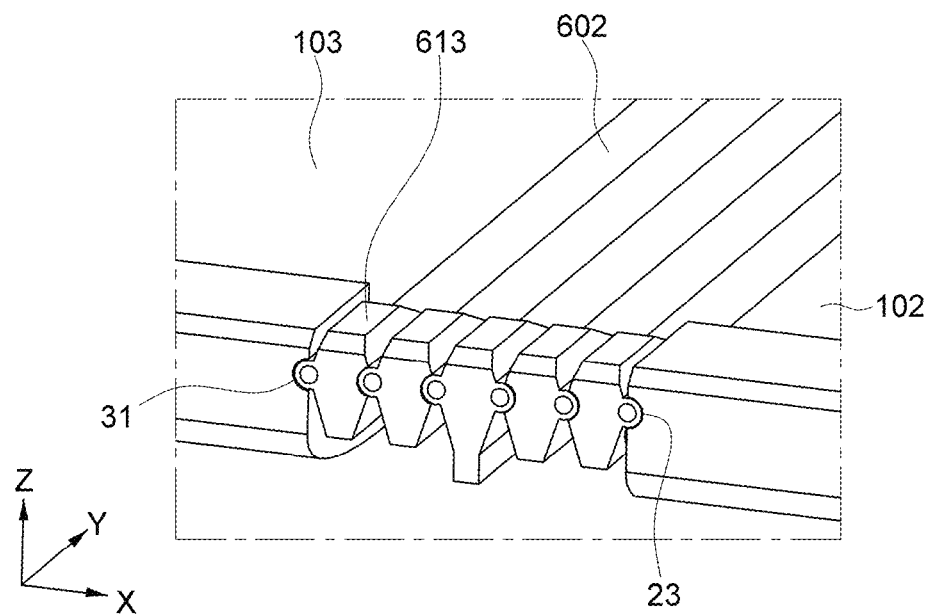
FIG. 7 is an explanatory view illustrating a connection relationship between the joint portions of FIG. 4 and a connection shaft.
Figure 8:
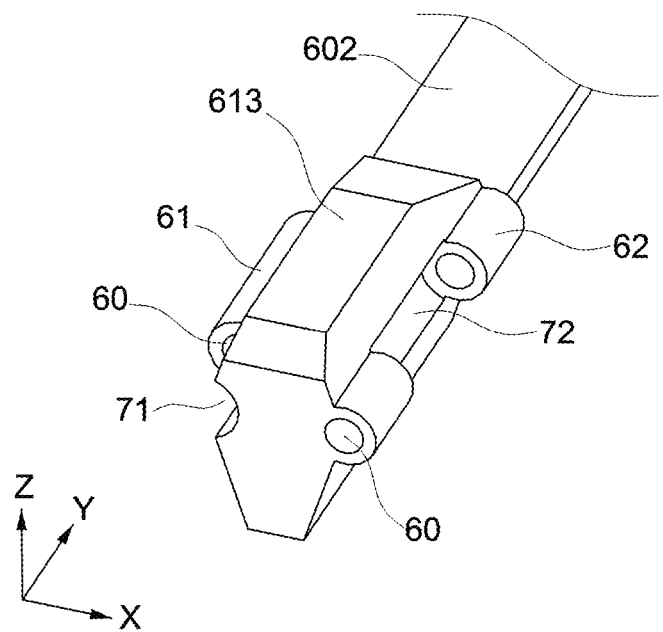
FIG. 8 is a perspective view illustrating a second hinge portion of FIG. 1.
Figure 9:
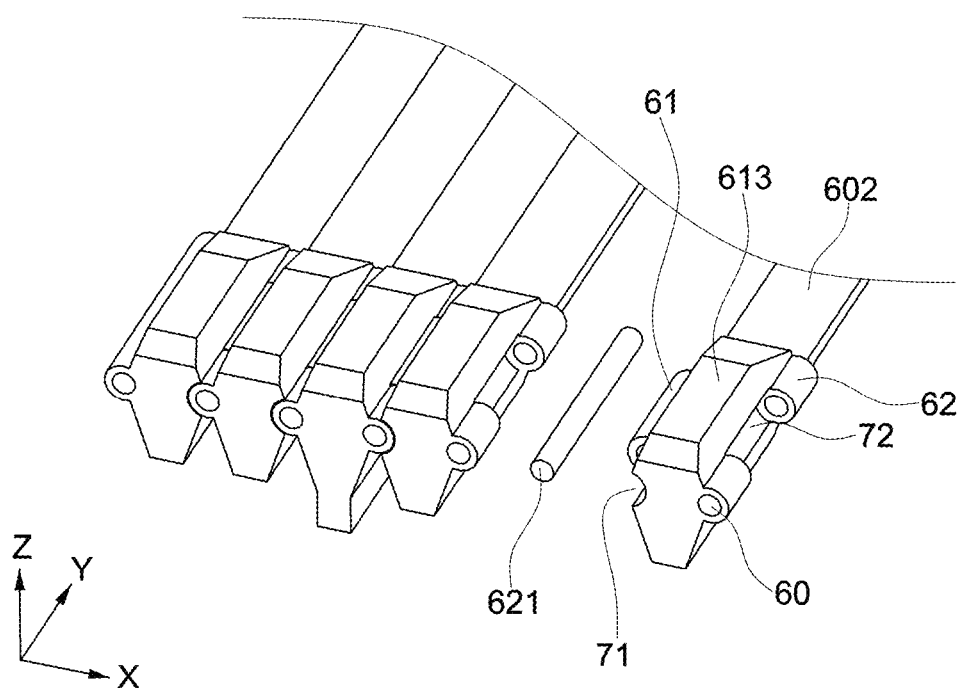
FIG. 9 is a detailed configuration view illustrating the second hinge portion of FIG. 8.

FIG. 6 is a perspective view illustrating the second hinge portion 152 of FIG. 1, FIG. 7 is a view illustrating a coupling relationship between the second hinge portion 152 and the support portions of FIG. 6, FIG. 8 is a perspective view illustrating one of joint portions 600 of FIG. 6, and FIG. 9 is an explanatory view illustrating a connection relationship between the joint portions 600 and the connection shaft.

As illustrated in FIGS. 6 to 9, the second hinge portion 152 may include a plurality of joint portions 600, a plurality of first connection shafts 621, and a plurality of second connection shafts 622.

Each of the joint portions 600 may include a second plate 602, a third coupling portion 613, and a fourth coupling portion 614.

The third coupling portion 613 is connected to one edge of the second plate 602, and the fourth coupling portion 614 is connected to another edge of the second plate 602. The second plate 602, the third coupling portion 613, and the fourth coupling portion 614 included in one joint portion 600 may be provided unitarily.

Adjacent ones of the third coupling portions 613 are hingedly coupled to each other through the first connection shafts 621. In an exemplary embodiment, each of the plurality of third coupling portions 613 may have a cross-section in a rhombus shape.

As illustrated in FIG. 8, at least one first protrusion 61 and at least one first recess 71 are alternately disposed on one surface of each of the third coupling portions 613, and at least one second protrusion 62 and at least one second recess 72 are alternately disposed on another surface of each of the third coupling portion 613. In such an exemplary embodiment, the second recess 72 is disposed at a position corresponding to the first protrusion 61, and the second protrusion 62 is disposed at a position corresponding to the first recess 71.

The first protrusion 61 and the second protrusion 62 have through hole 60 penetrating respective center portion of the first protrusion 61 and the second protrusion 62.

In an exemplary embodiment, the first protrusion 61 and the second protrusion 62 each have a shape of a protruding cylinder, and the first recess 71 and the second recess 72 each have a concave shape.

The first protrusion 61 provided at one of facing surfaces of the third coupling portions 613 adjacent to each other faces the second recess 72 provided at the other of the facing surfaces. This first protrusion 61 is inserted into the second recess 72. After the protrusions and the recesses of the third coupling portions 613 adjacent to each other are coupled to each other, the first connection shaft 621 is inserted into the holes of the protrusions. In such a manner, the third coupling portions 613 adjacent to each other may be coupled in a hinged manner.

In an exemplary embodiment, as illustrated in FIG. 7, the third coupling portion 613 disposed at one outermost position of the plurality of third coupling portions 613 is connected to the third connection portion 23 of the second support portion 102 through the first connection shaft 621, and the third coupling portion 613 disposed at another outermost position of the plurality of third coupling portions 613 is connected to the first connection portion 31 of the third support portion 103 through the first connection shaft 621. In such an exemplary embodiment, the third coupling portion 613 disposed at the one outermost position of the plurality of third coupling portions 613 is disposed most adjacent to the second support portion 102 among the plurality of third coupling portions 613, and the third coupling portion disposed at the another outermost position of the plurality of third coupling portions 613 is disposed most adjacent to the third support portion 103 among the plurality of third coupling portions 613.

As illustrated in FIG. 6, adjacent ones of the fourth coupling portions 614 are hingedly coupled to each other through the second connection shafts 622. In an exemplary embodiment, each of the plurality of fourth coupling portions 614 may have a cross-section in a rhombus shape.

The fourth coupling portion 614 may include or have the first protrusion 61, the second protrusion 62, the first recess 71, and the second recess 72 described above. Specifically, at least one first protrusion and at least one first recess are alternately disposed on one surface of each of the fourth coupling portions 614, and at least one second protrusion and at least one second recess are alternately disposed on another surface of each of the fourth coupling portions 614. In such an exemplary embodiment, the second recess is disposed at a position corresponding to the first protrusion, and the second protrusion is disposed at a position corresponding to the first recess.

In an exemplary embodiment, the first and second projections each have a shape of a protruding cylinder, and the first and second recesses have a concave shape.

The first protrusion provided at one of facing surfaces of the fourth coupling portions 614 adjacent to each other faces the second recess provided at the other surface of the facing surfaces. This first protrusion is inserted into the second recess. After the protrusions and the recesses of the fourth coupling portions 614 adjacent to each other are coupled to each other, the second connection shaft 622 is inserted into the holes of the protrusions. In such a manner, the fourth coupling portions 614 adjacent to each other may be coupled in a hinged manner.

In an exemplary embodiment, the fourth coupling portion 614 disposed at one outermost position of the plurality of fourth coupling portions 614 is connected to the fourth connection portion 24 of the second support portion 102 through the second connection shaft 622, and the fourth coupling portion 614 disposed at another outermost position of the plurality of fourth coupling portions 614 is connected to the second connection portion 32 of the third support portion 103 through the second connection shaft 622. In such an exemplary embodiment, the fourth coupling portion 614 disposed at the one outermost position of the plurality of fourth coupling portions 614 is disposed most adjacent to the second support portion 102 among the plurality of fourth coupling portions 614, and the fourth coupling portion disposed at the another outermost position of the plurality of fourth coupling portions 614 is disposed most adjacent to the third support portion 103 among the plurality of fourth coupling portions 614.

Figure 10:
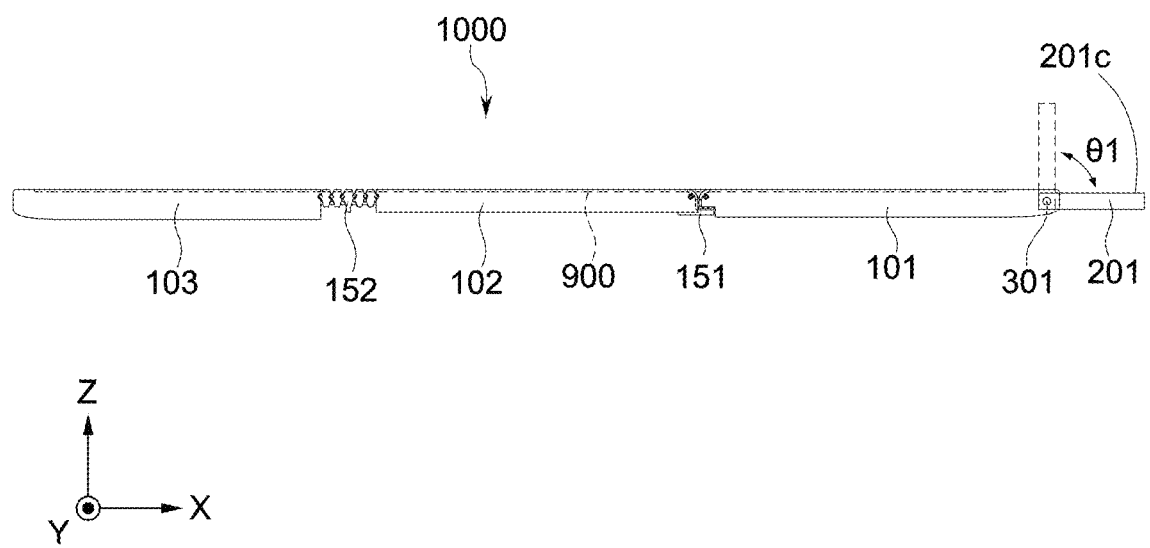
FIG. 10 is a view illustrating the display device of FIG. 1 viewed in the direction of an arrow in a Y-axis direction.
Figure 11:
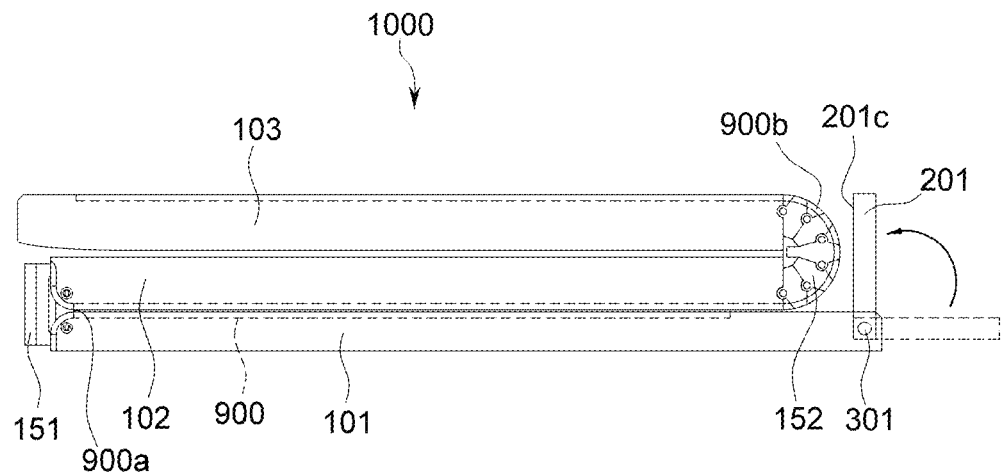
FIG. 11 is a view illustrating a folded state of the display device of FIG. 10.
Figure 11:
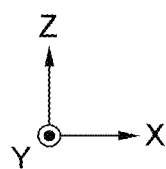

FIG. 10 is a view illustrating the display device of FIG. 1 viewed in the direction of an arrow in a Y-axis direction, and FIG. 11 is a view illustrating a folded state of the display device of FIG. 10.

As illustrated in FIG. 10, the first protection portion 201 and the first support portion 101 may define a predetermined angle θ1. In an exemplary embodiment, the angle θ1 between the first protection portion 201 and the first support portion 101 may be in a range from about 90 degrees to about 180 degrees, for example. In other words, an angle defined between an inner side surface 201c of the first protection portion 201 and the support surface 111 of the first support portion 101 may be in a range from about 90 degrees to about 180 degrees. In another exemplary embodiment, the angle θ1 between the first protection portion 201 and the first support portion 101 may be in a range from about 80 degrees to about 190 degrees.

In a state illustrated in FIG. 10, when the second support portion 102 rotates about 180 degrees toward the support surface 111 of the first support portion 101, and the third support portion 103 rotates about 180 degrees toward the rear surface 112 of the second support portion 102, the support portions 101, 102, and 103 may be disposed along the Z-axis direction (e.g., the vertical direction), as illustrated in FIG. 11. As illustrated in FIG. 11, when the display device 1000 is folded, the second support portion 102 may be disposed on the first support portion 101, and the third support portion 103 may be disposed on the second support portion 102. In such an exemplary embodiment, the support surface 111 of the first support portion 101 and the support surface 111 of the second support portion 102 may face each other, and the rear surface 112 of the second support portion 102 and the rear surface 112 and the third support portion 103 may face each other. When the panel support portion 100 is folded in such a manner, the display panel 900 on the panel support portion 100 is also kept in the folded state. In an exemplary embodiment, a display panel portion on the first hinge portion 151 and a display panel portion on the second hinge portion are curved, for example. In other words, the first curved portion 900a of the display panel 900 is disposed on the first hinge portion 151, and the second curved portion 900b of the display panel 900 is disposed on the second hinge portion 152.

As illustrated in FIG. 11, the first protection portion 201 may rotate 90 degrees toward the support surface 111 of the first support portion 101. In such an exemplary embodiment, the first protection portion 201 is disposed in a perpendicular direction with respect to the support surface 111 of the first support portion 101. In other words, the first protection portion 201 may have a shape protruding along the Z-axis direction.

The first protection portion 201 protruding in the Z-axis direction faces the second hinge portion 152 and the second curved portion 900b of the display panel 900 in the X-axis direction. Accordingly, the first hinge portion 151 and the second curved portion 900b of the display panel 900 may be disposed between a side surface of the panel support portion 100 (e.g., a side surface of the third support portion 103 and a side surface of the second support portion 102) and the first protection portion 201. Accordingly, the first hinge portion 151 and the second curved portion 900b of the display panel 900 may be protected by the first protection portion 201.

In an exemplary embodiment, an angle between the first protection portion 201 and the first support portion 101 may be fixed at about 90 degrees. In such an exemplary embodiment, the first protection portion 201 may be connected to the first support portion 101 in a fixed state. In an exemplary embodiment, the first protection portion 201 may have a shape protruding from one edge of the first support portion 101, for example.

Figure 12:
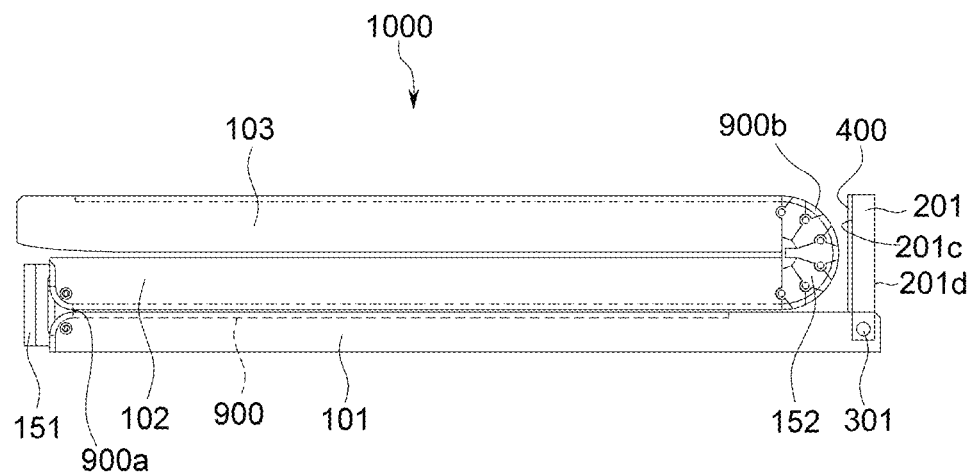
FIG. 12 is a view illustrating another exemplary embodiment of a display device.
Figure 12:
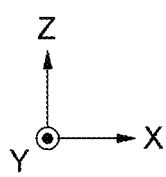
Figure 13:
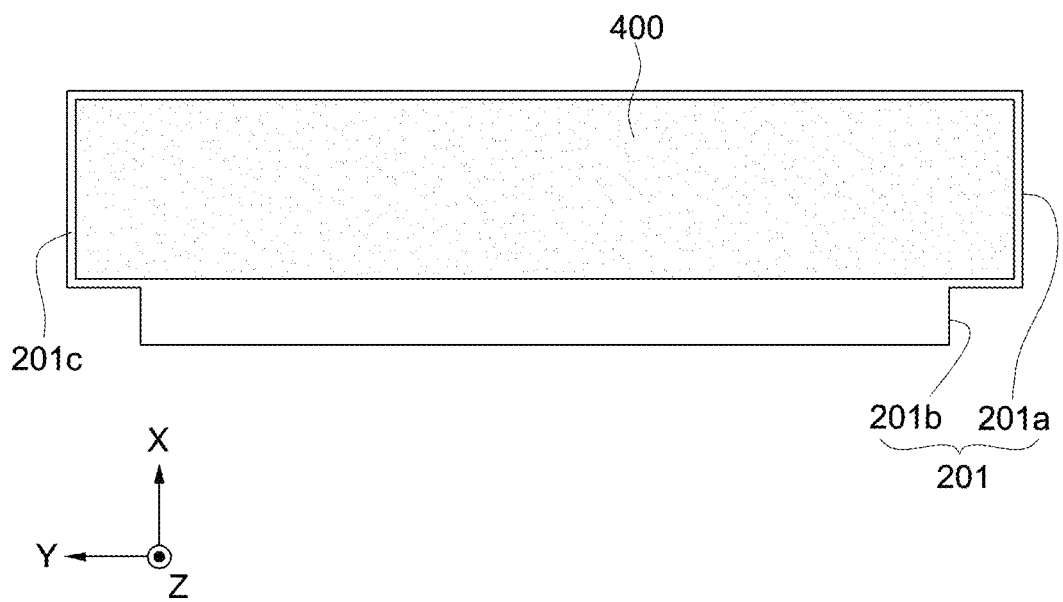
FIG. 13 is an explanatory view illustrating an exemplary embodiment of a buffer portion of FIG. 12.
Figure 14:
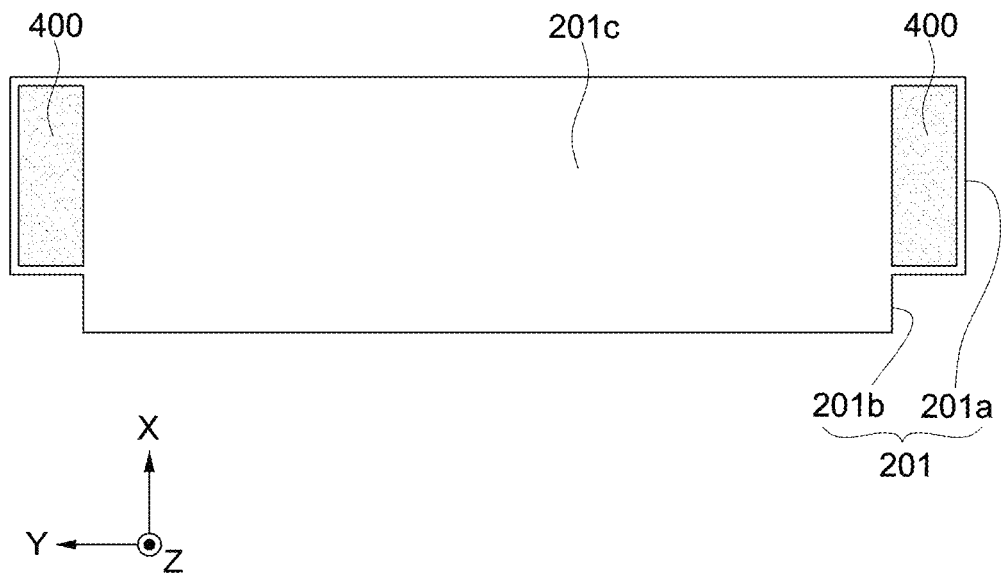
FIG. 14 is an explanatory view illustrating another exemplary embodiment of the buffer portion of FIG. 12.

FIG. 12 is a view illustrating another exemplary embodiment of the display device 1000, FIG. 13 is an explanatory view illustrating an exemplary embodiment of the buffer portion 400 of FIG. 12, and FIG. 14 is an explanatory view illustrating another exemplary embodiment of the buffer portion 400 of FIG. 12.

As illustrated in FIG. 12, the display device 1000 in an exemplary embodiment may further include a buffer portion 400 disposed at the inner side surface 201c of the first protection portion 201.

As illustrated in FIG. 13, the buffer portion 400 may be disposed over an entire surface of the inner side surface 201c of the protection plate 201a.

In another exemplary embodiment, the buffer portion 400 may be disposed at each of opposite edges of the inner side surface 201c of the protection plate 201a, as illustrated in FIG. 14. The buffer portions 400 disposed at the opposite edges thereof do not overlap the display panel 900.

In an exemplary embodiment, the buffer portion 400 may include at least one of acryl, silicone, and rubber, for example.

Figure 15:
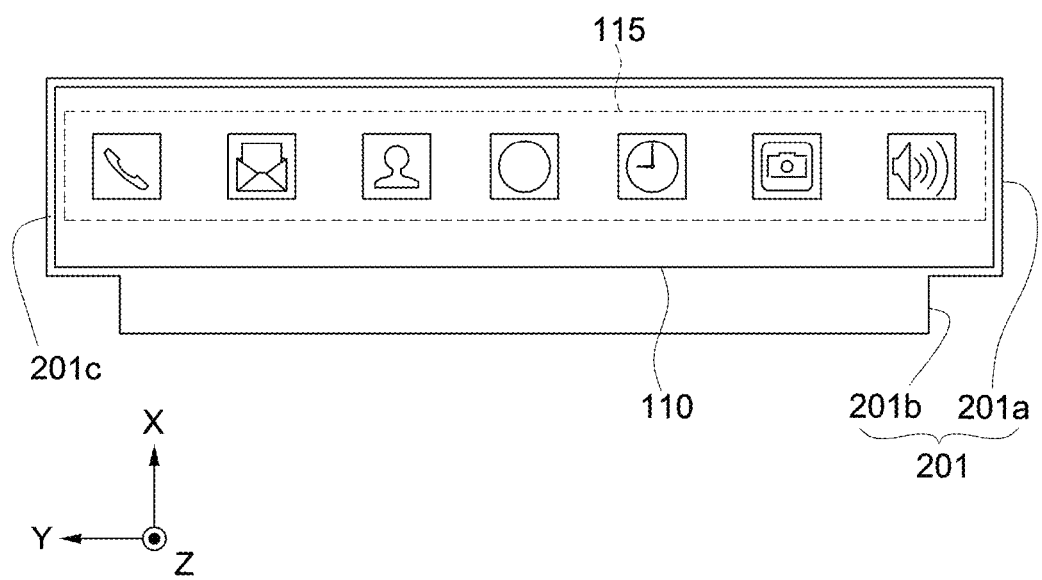
FIG. 15 is a view illustrating another exemplary embodiment of a first protection portion of a display device.

FIG. 15 is a view illustrating another exemplary embodiment of the first protection portion 201 of the display device 1000.

As illustrated in FIG. 15, the display device 1000 in an exemplary embodiment may further include an auxiliary display panel 110 disposed at the inner side surface 201c of the first protection portion 201.

On a display surface of the auxiliary display panel 110, for example, icons 115 related to various functions such as a call, a message, a phone book, the internet, a clock, a camera, a volume control, and the like may be displayed.

In an exemplary embodiment, the aforementioned auxiliary display panel 110 may be disposed at an outer side surface 201d, instead of the inner side surface 201c, of the first protection portion 201. In an alternative exemplary embodiment, the aforementioned auxiliary display panel 110 may be disposed on both the inner side surface 201c and the outer side surface 201d of the first protection portion 201.

Figure 16:
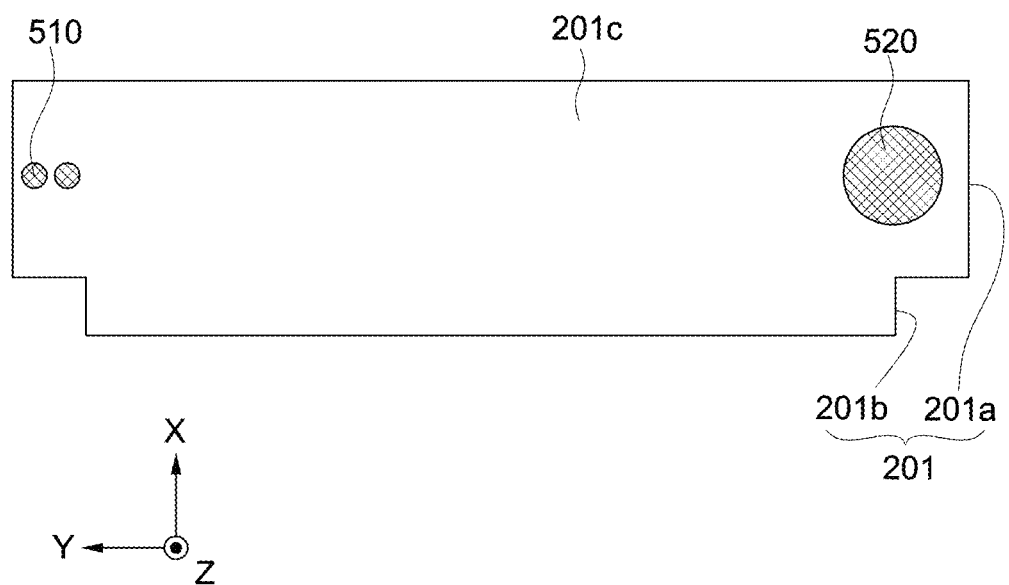
FIG. 16 is a view illustrating another exemplary embodiment of a first protection portion of a display device.
Figure 17:
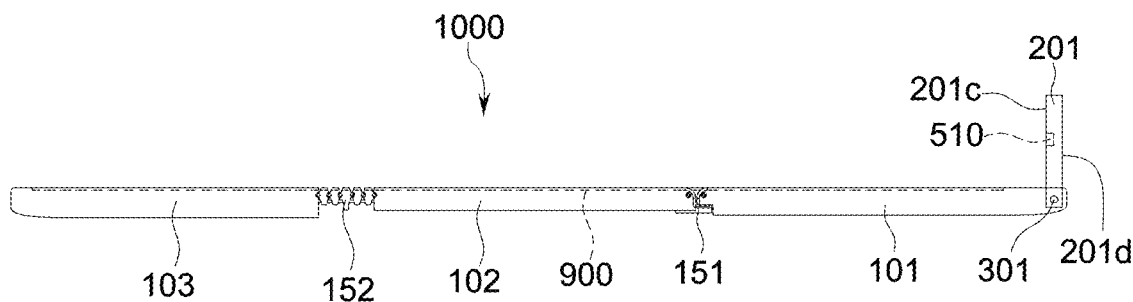
FIGS. 17 and 18 are explanatory views illustrating an operation of a mode determination sensor of FIG. 16.
Figure 18:
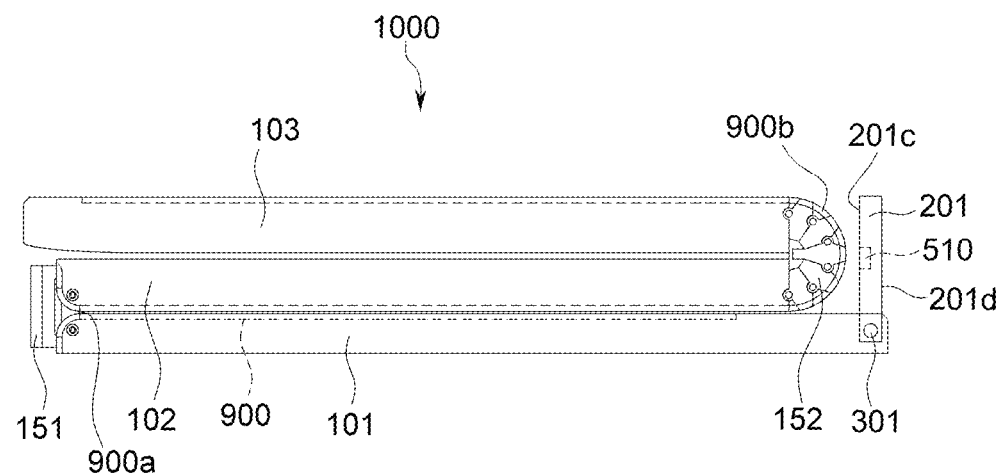
Figure 18:
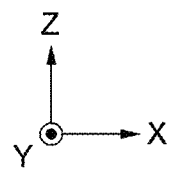

FIG. 16 is a view illustrating another exemplary embodiment of the first protection portion 201 of the display device 1000, and FIGS. 17 and 18 are explanatory views illustrating an operation of a mode determination sensor 510 of FIG. 16.

As illustrated in FIG. 16, the display device in an exemplary embodiment may include at least one of a mode determination sensor 510 and a fingerprint sensor 520 disposed at the inner side surface 201c of the first protection portion 201.

The mode determination sensor 510 may detect whether the display device 1000 is folded. In an exemplary embodiment, when the display device 1000 is fully unfolded as illustrated in FIG. 17, for example, light from the mode determination sensor 510 is not blocked, and in such a case, the mode determination sensor 510 determines that the display device 1000 is in an unfolding mode. When the display device 1000 is completely folded as illustrated in FIG. 18, light from the mode determination sensor 510 is blocked by the second hinge portion 152, and in such a case, the mode determination sensor 510 determines that the display device 1000 is in a folding mode. In an exemplary embodiment, the mode determination sensor 510 described above may be disposed at an edge of the first protection portion 201 so that the light from the mode determination sensor 510 may be substantially prevented from being blocked by a user's finger or the like. The edge of the first protection portion 201 corresponds to one edge of the second hinge portion 152.

In an exemplary embodiment, the mode determination sensor 510 may include an infrared sensor, for example.

The detection result from the mode determination sensor 510 may be displayed on the display panel 900. In an exemplary embodiment, when the display device 1000 is in the unfolding mode, a text such as "unfolding mode" may be displayed on the display panel 900, for example. When the display device 1000 is in the folding mode, a text such as "folding mode" may be displayed on the display panel 900. Such text may be displayed on the display surface 991 of the auxiliary display panel 110 described above.

The fingerprint sensor 520 detects a fingerprint in contact with the fingerprint sensor 520. A driver of the display device 1000 may compare the detected fingerprint with a pre-registered fingerprint, and limit the use authority of the display device 1000 according to the comparison result. In an exemplary embodiment, when the fingerprint detected by the fingerprint sensor 520 and the registered fingerprint match, the display surface 991 of the display panel 900 may be activated, for example.

Figure 19:
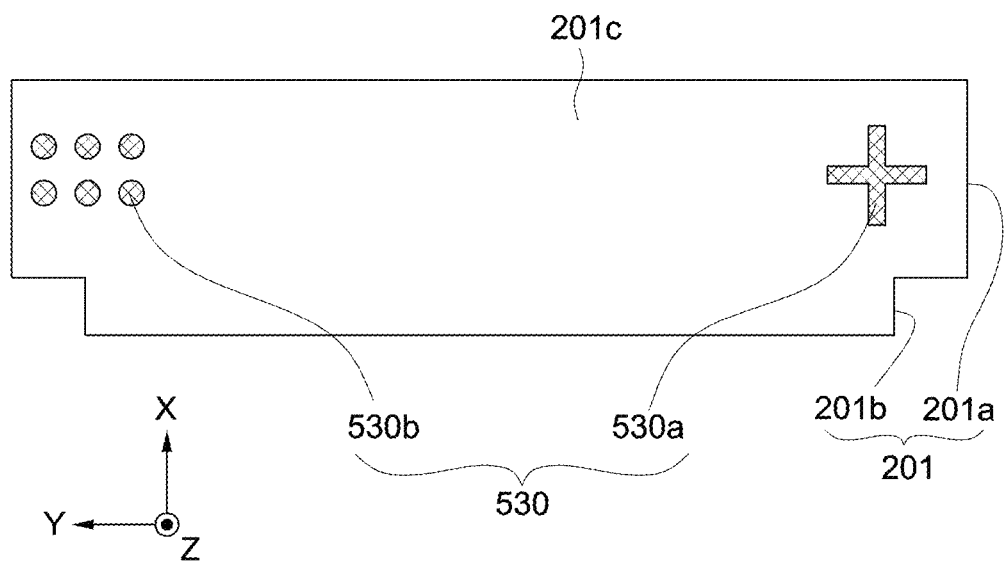
FIG. 19 is a view illustrating another exemplary embodiment of a first protection portion of a display device.

FIG. 19 is a view illustrating another exemplary embodiment of the first protection portion 201 of the display device 1000.

As illustrated in FIG. 19, the display device 1000 in an exemplary embodiment may include a physical manipulation unit 530 disposed at the inner side surface 201c of the first protection portion 201.

The physical manipulation unit 530 may include, for example, a direction control key 530a in a cross-like shape, and a push button 530b. The screen of the display panel 900 may be controlled by manipulating the physical manipulation unit 530.

In an exemplary embodiment, the physical manipulation unit 530 may be disposed at an outer side surface of the first protection portion 201.

Figure 20:
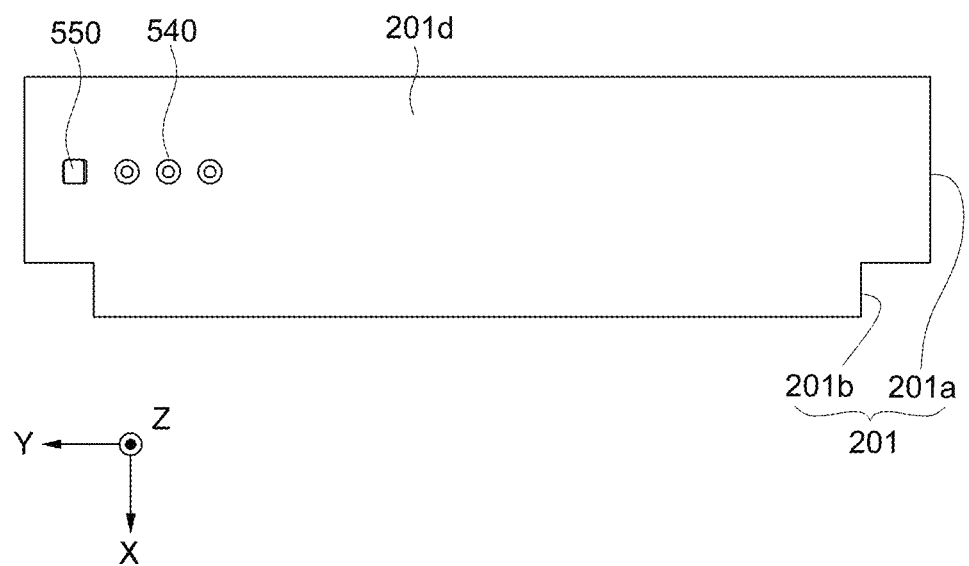
FIG. 20 is a view illustrating another exemplary embodiment of a first protection portion of a display device.

FIG. 20 is a view illustrating another exemplary embodiment of the first protection portion 201 of the display device 1000.

As illustrated in FIG. 20, the display device 1000 in an exemplary embodiment may include at least one of an imaging unit 540 and a lighting unit 550 disposed at the outer side surface 201d of the first protection portion 201.

The imaging unit 540 may include a camera. An image captured by the imaging unit 540 may be displayed on the display panel 900.

The lighting unit 550 emits light. The lighting unit 550 may emit light in synchronization with a capturing time of the imaging unit 540. In addition, the lighting unit 550 may be driven independently regardless of whether the imaging unit 540 is capturing images.

Figure 21:
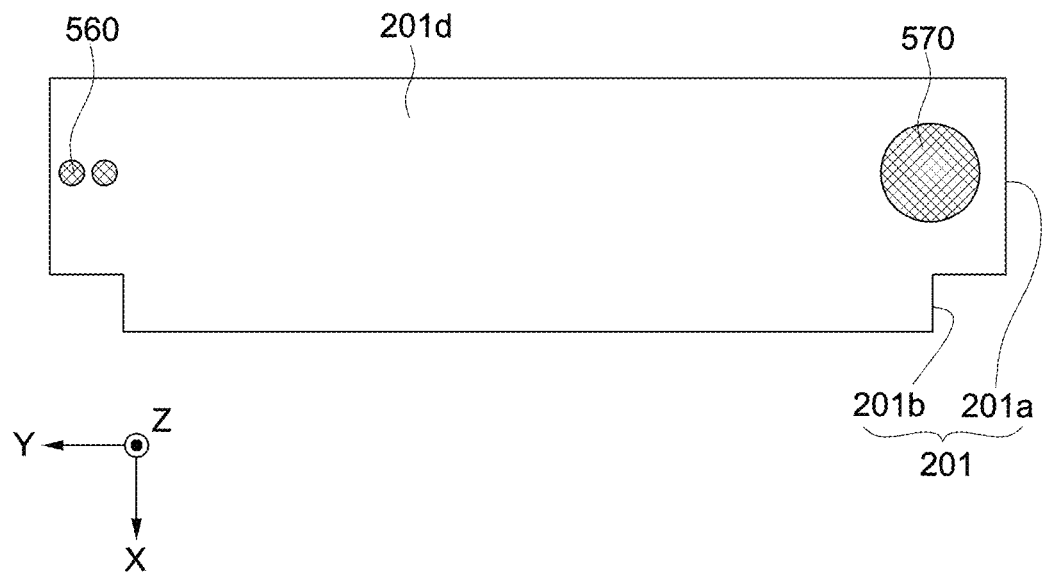
FIG. 21 is a view illustrating another exemplary embodiment of a first protection portion of a display device.
Figure 22:
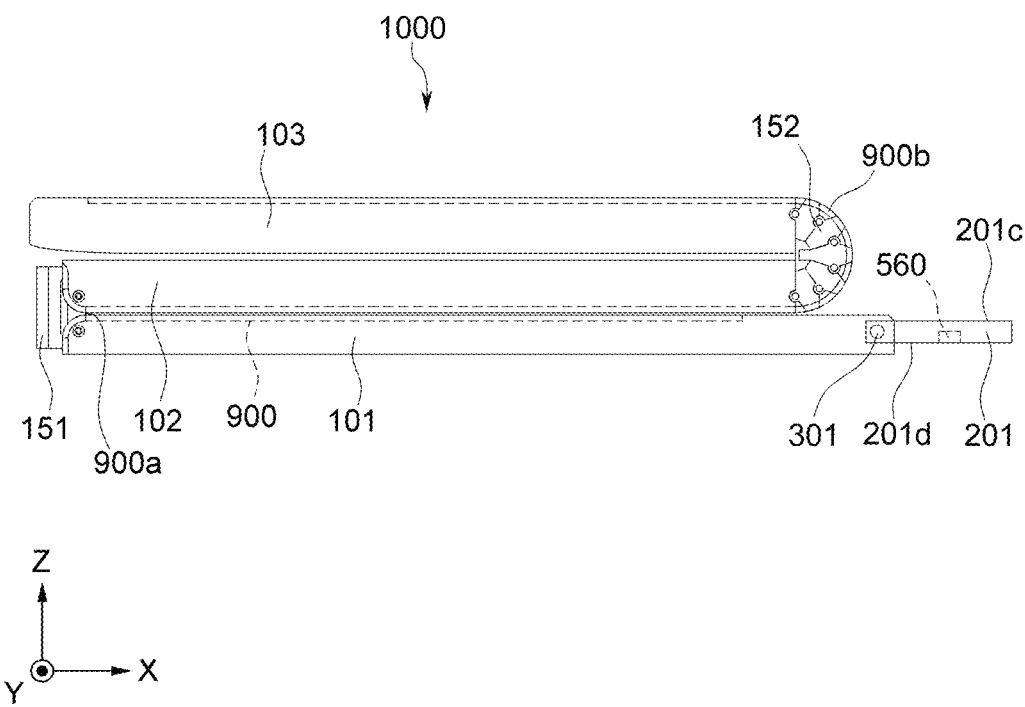
FIGS. 22 and 23 are explanatory views illustrating an operation of a position determination sensor of FIG. 21.
Figure 23:
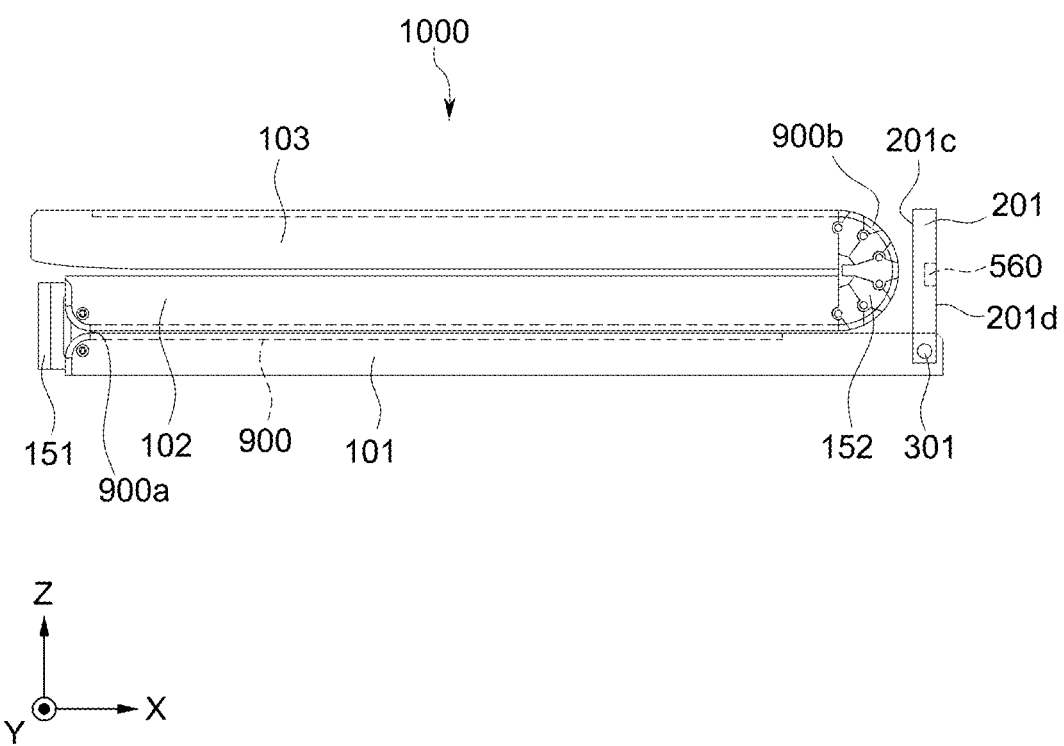

FIG. 21 is a view illustrating another exemplary embodiment of the first protection portion 201 of the display device 1000, and FIGS. 22 and 23 are explanatory views illustrating an operation of a position determination sensor 560 of FIG. 21.

As illustrated in FIG. 21, the display device 1000 in an exemplary embodiment includes at least one of a position determination sensor 560 and a fingerprint sensor 570 disposed on the outer side surface 201d of the first protection portion 201.

The position determination sensor 560 may determine a position of the first protection portion 201. In an exemplary embodiment, as illustrated in FIG. 22, when the first protection portion 201 defines an angle of about 180 degrees with the first support portion 101, the position determination sensor 560 detects this and transmits the detection result to the driver of the display device 1000, for example. In such an exemplary embodiment, the driver may control the display panel 900 to display, on the display panel 900, the angle between the first protection portion 201 and the first support portion 101. In an exemplary embodiment, when the first protection portion 201 defines an angle of about 90 degrees with the first support portion 101 as illustrated in FIG. 23, the position determination sensor 560 detects the angle and transmits the detection result to the driver of the display device 1000. In such an exemplary embodiment, the driver may control the display panel 900 to display, on the display panel 900, the angle between the first protection portion 201 and the first support portion 101.

The fingerprint sensor 570 detects a fingerprint in contact with the fingerprint sensor 570. Since the fingerprint sensor 570 is substantially the same as the fingerprint sensor 520 of FIG. 16, the description of the fingerprint sensor 570 of FIG. 21 will refer to the description of the fingerprint sensor 520 of FIG. 16.

Figure 24A:
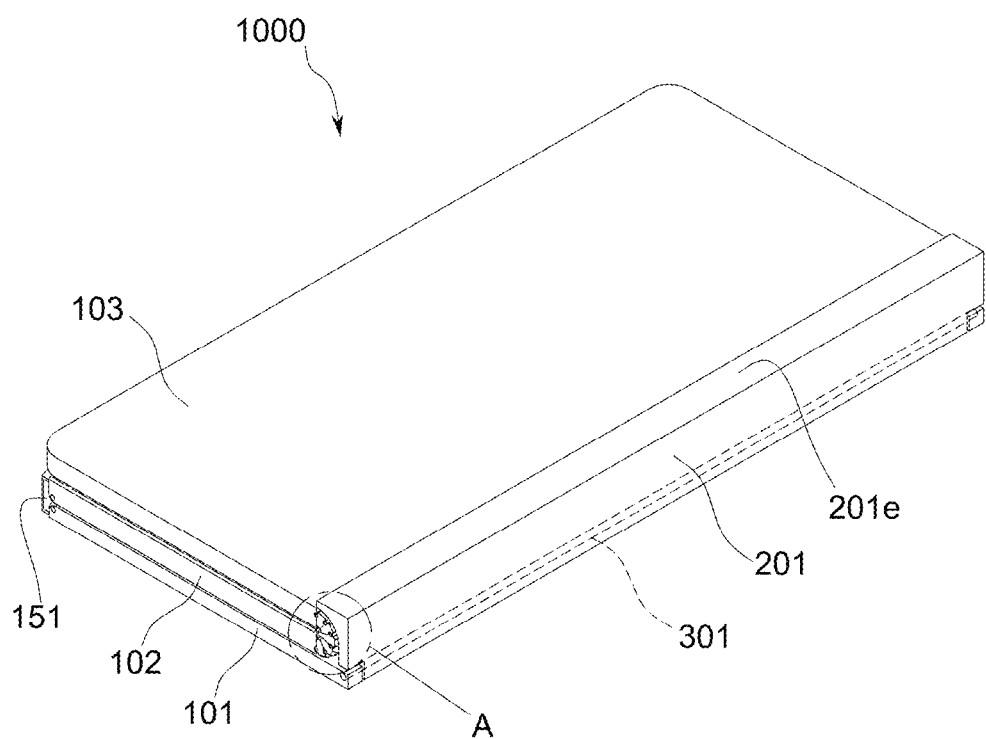
FIGS. 24AA and 24B are explanatory views illustrating another exemplary embodiment of a first protection portion, and FIG. 24AB is an enlarged view of a portion "A" of the first protection portion of FIG. 24AA.
Figure 24A:
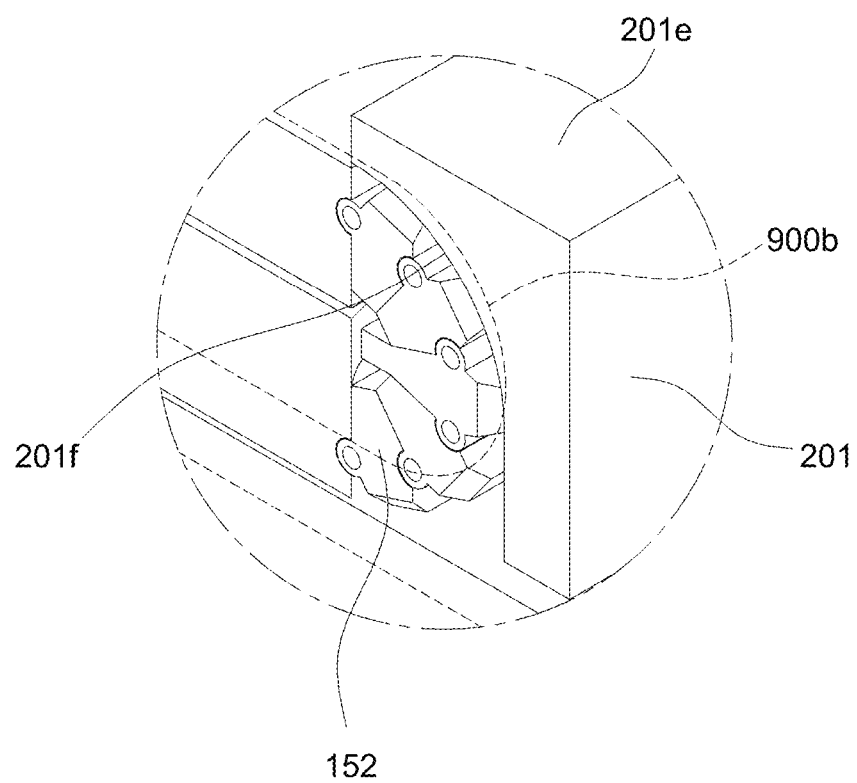
Figure 24B:
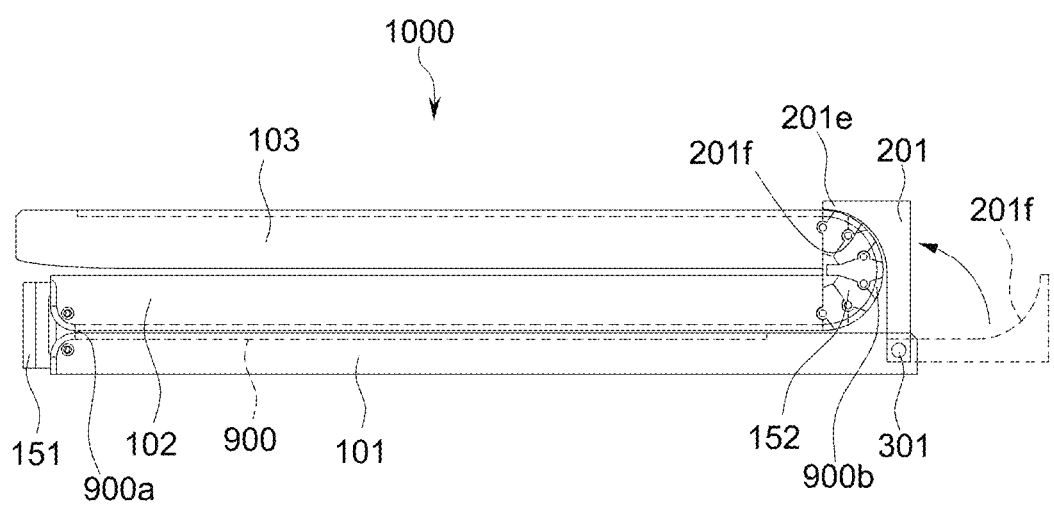
Figure 24B:
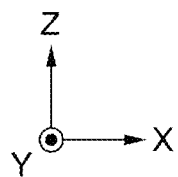

FIGS. 24A and 24B are explanatory views illustrating another exemplary embodiment of the first protection portion 201.

As illustrated in FIGS. 24A and 24B, the first protection portion 201 may have a thickness which gradually increases, as further away from the third support portion 103. To this end, the first protection portion 201 may further include a protrusion 201e protruding from the protection plate 201a. The protrusion 201e may protrude from one edge of the protection plate 201a. In an exemplary embodiment, an inner side surface 201f of the protrusion 201e may have a round shape, for example. In such an exemplary embodiment, a curvature of the protrusion 201e and a curvature of the second curved portion 900b of the display panel 900 may be substantially the same as each other.

Although not illustrated, at least one of the buffer portion 400, the auxiliary display panel 110, the mode determination sensor 510, the fingerprint sensor 520, and the physical manipulation unit 530 described above may be disposed at the inner side surface 201c of the first protection portion 201 of FIGS. 24A and 24B. In addition, at least one of the imaging unit 540, the lighting unit 550, the position determination sensor 560, and the fingerprint sensor 570 described above may be disposed on the outer side surface 201d of the first protection portion 201 of FIGS. 24A and 24B.

Figure 25A:
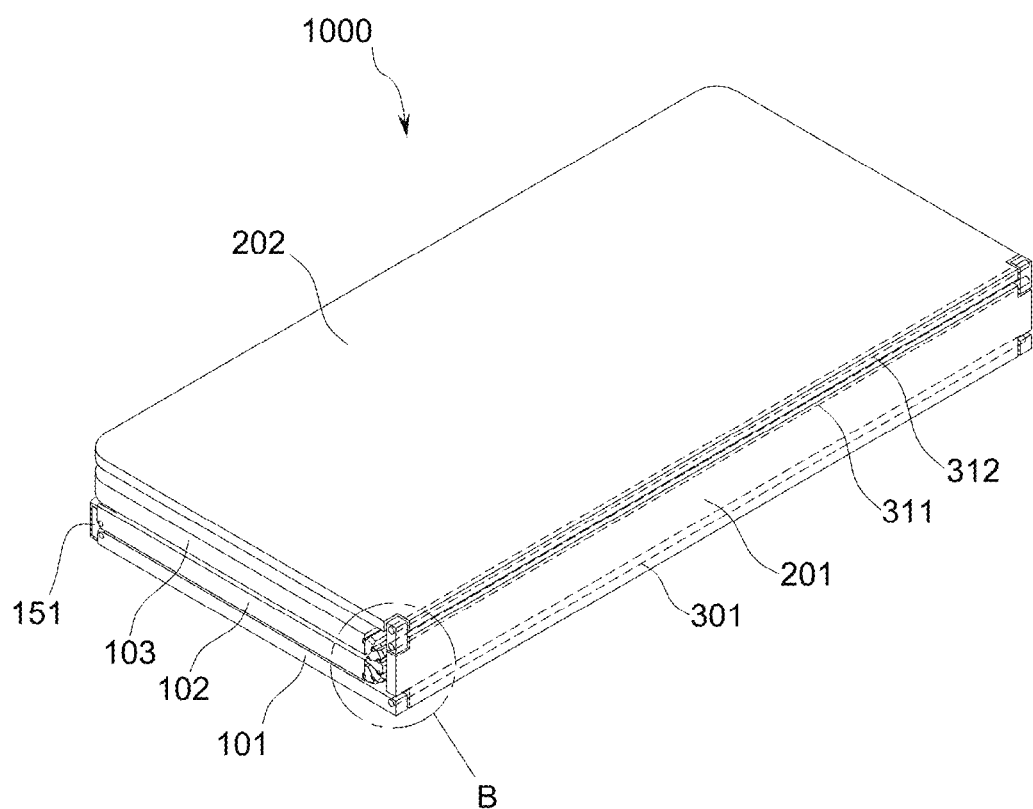
FIGS. 25AA to 25C are views illustrating another exemplary embodiment of a display device, and FIG. 25AB is an enlarged view of a portion "B" of the display device of FIG. 25AA.
Figure 25A:
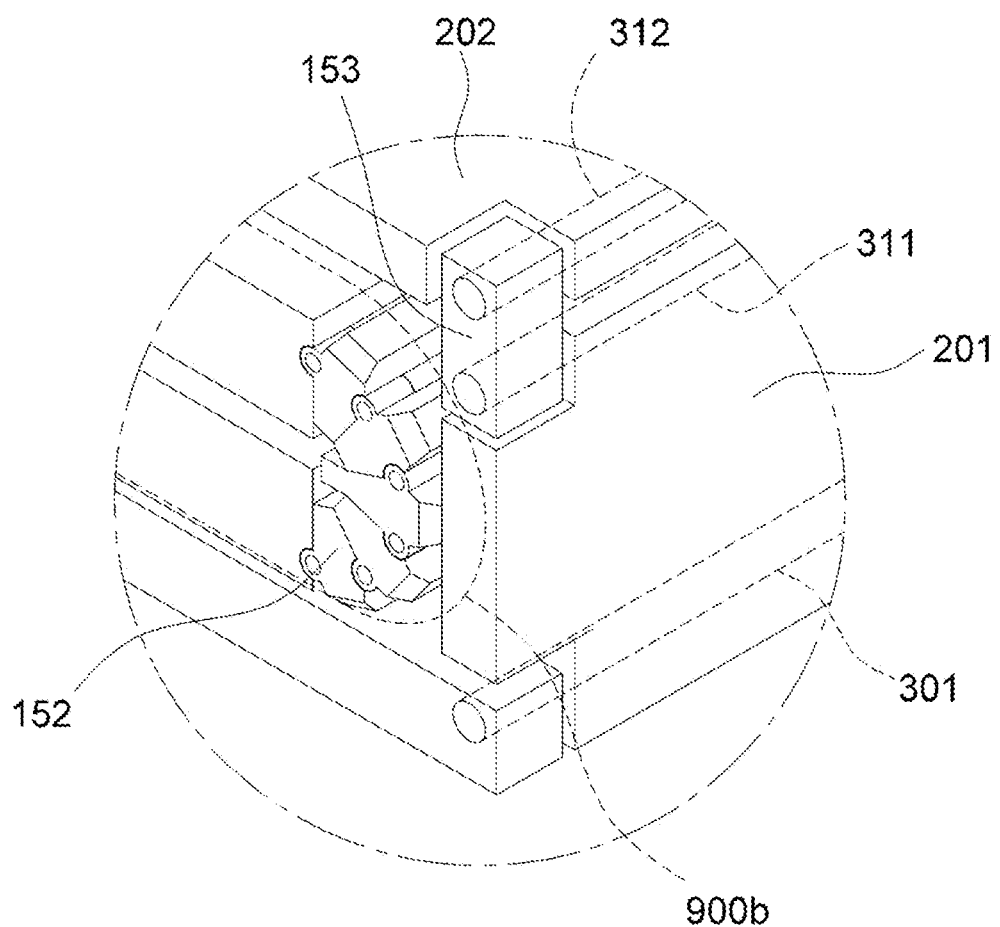
Figure 25B:
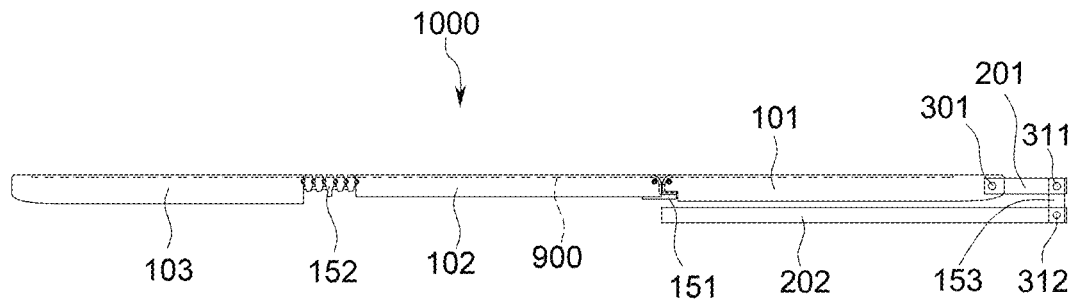
Figure 25B:
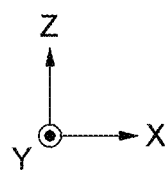

FIGS. 25AA to 25C are views illustrating another exemplary embodiment of the display device 1000.

The display device 1000 in another exemplary embodiment may further include a second protection portion 202, as illustrated in FIGS. 25AA to 25C.

The second protection portion 202 is rotatably connected to the first protection portion 201. In an exemplary embodiment, the second protection portion 202 may be connected to the first protection portion 201 through a third hinge portion 153, for example. The second protection portion 202 may be rotatable 360 degrees with reference to the third hinge portion 153.

One end portion of the third hinge portion 153 may be rotatably connected to the first protection portion 201 through a first connection shaft 311, and another end portion of the third hinge portion 153 may be connected to the second protection portion 202 through a second connection shaft 312.

A rotation shaft of the second protection portion 202 may be substantially parallel to at least one of a rotation shaft of the first hinge portion 151 and a rotation shaft of the second hinge portion 152.

Figure 25C:
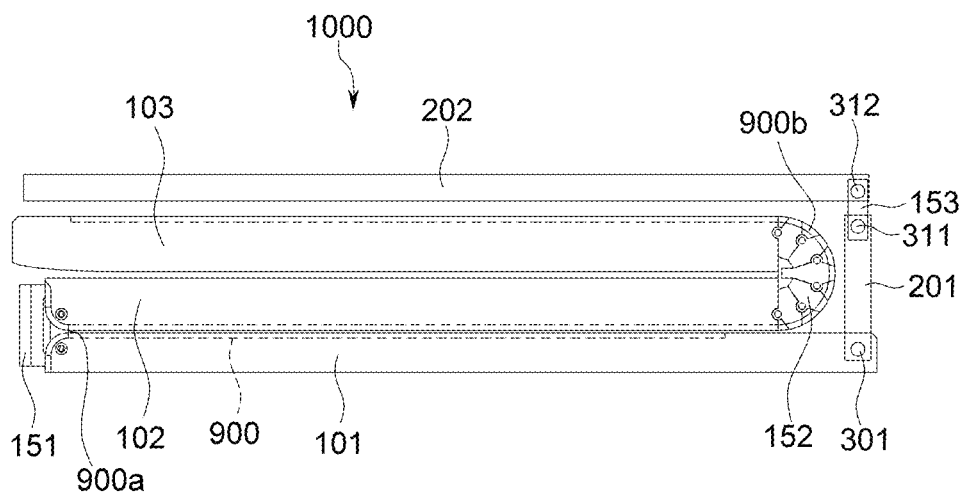
Figure 25C:
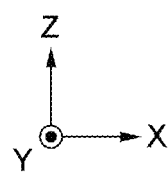

As illustrated in FIG. 25C, the second protection portion 202 may rotate in a counterclockwise direction to be disposed on the third support portion 103. The second protection portion 202 faces the display surface of the display panel 900 disposed on the support surface 111 on the third support portion 103. The display panel 900 on the support surface 111 may be protected by the second protection portion 202. In an exemplary embodiment, the display surface 991 (refer to FIG. 1) of the display panel 900 on the support surface 111 may be protected by the second protection portion 202, for example.

The second protection portion 202 may include a transparent material or a translucent material.

As illustrated in FIG. 25C, when the second protection portion 202 is disposed on the third support portion 103, the second protection portion 202 may contact the display panel 900 on the third support portion 103. In other words, the second protection portion 202 may contact the display surface 991 of the display panel 900.

In an exemplary embodiment, a touch applied from the outside to the second protection portion 202 may be recognized by a touch sensing unit of the display panel 900.

In an exemplary embodiment, although not illustrated, at least one of the buffer portion 400, the auxiliary display panel 110, the mode determination sensor 510, the fingerprint sensor 520, and the physical manipulation unit 530 described above may be disposed at the inner side surface 201c of the first protection portion 201 of FIGS. 25AA to 25C. In addition, at least one of the imaging unit 540, the lighting unit 550, the position determination sensor 560, and the fingerprint sensor 570 described above may be disposed on the outer side surface 201d of the first protection portion 201 of FIGS. 25AA to 25C.

In addition, the first protection portion 201 of FIGS. 25AA to 25C may have a shape substantially the same as a shape of the first protection portion 201 of FIGS. 24AA and 24B described above.

Figure 26:
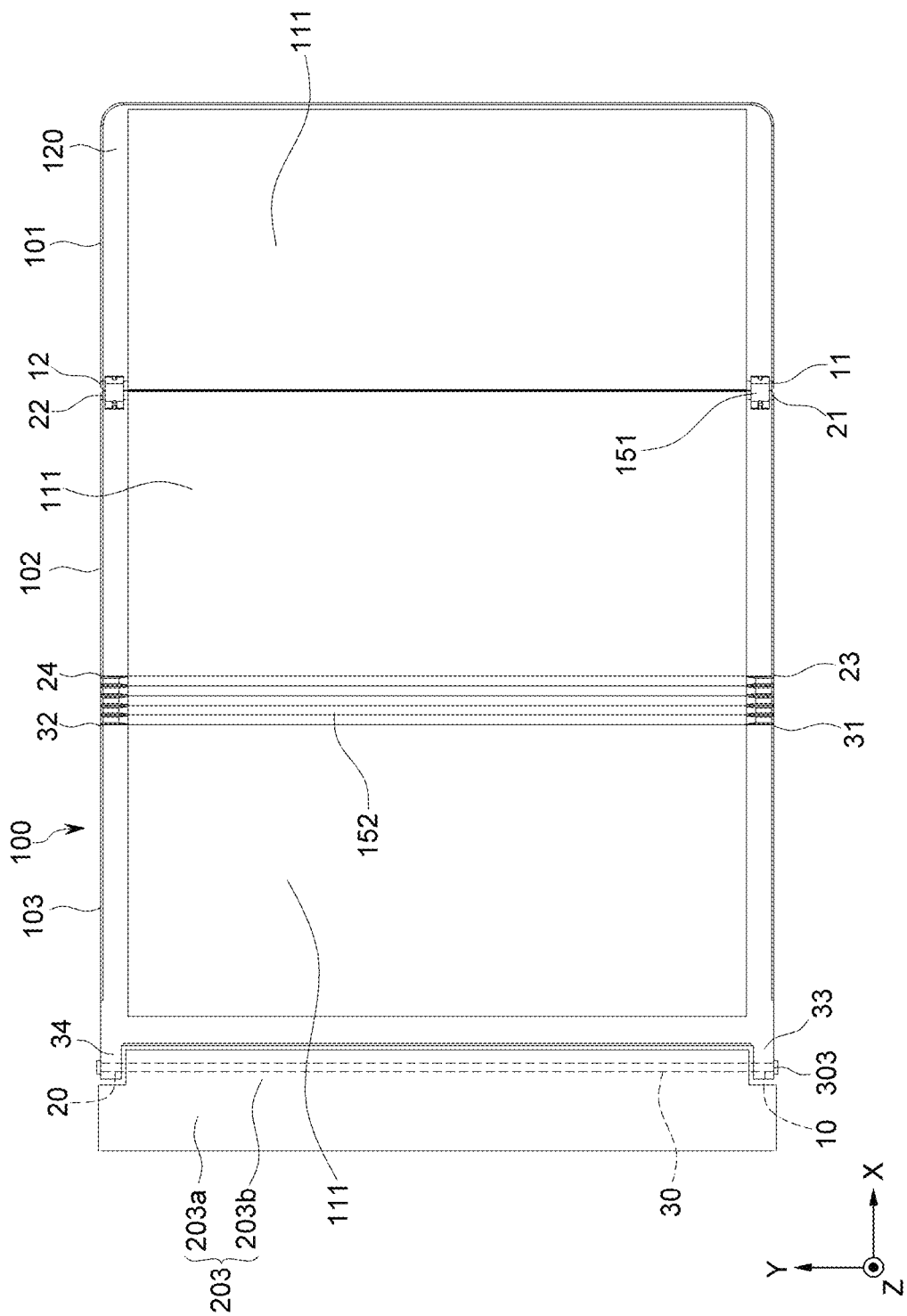
FIG. 26 is a view illustrating another exemplary embodiment of a display device.
Figure 27:
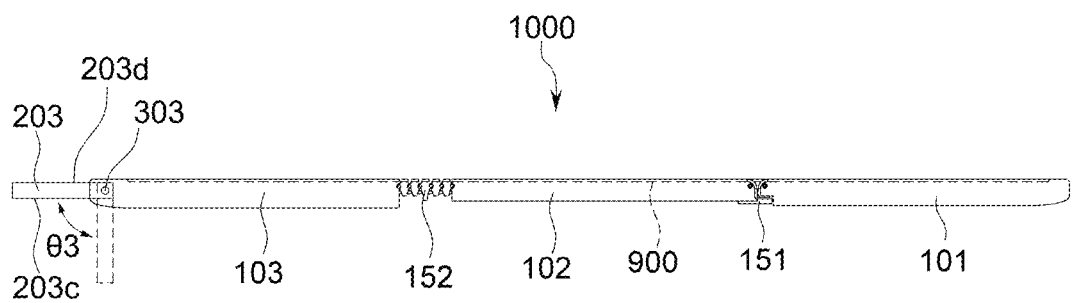
FIG. 27 is a view illustrating the display device of FIG. 26 viewed in the direction of an arrow in the Y-axis direction.
Figure 27:
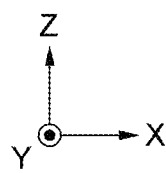
Figure 28:
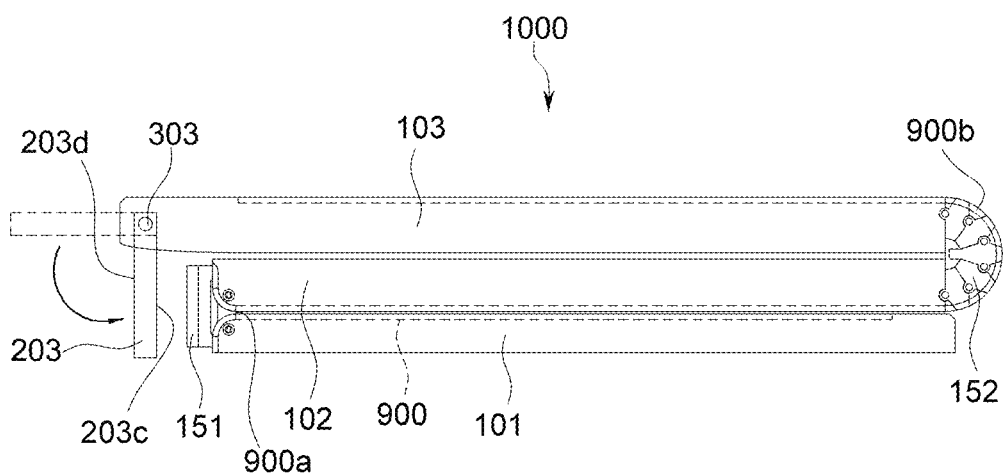
FIG. 28 is a view illustrating a folded state of the display device of FIG. 27.
Figure 28:
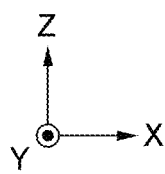

FIG. 26 is a view illustrating another exemplary embodiment of the display device 1000, FIG. 27 is a view illustrating the display device 1000 of FIG. 26 viewed in the direction of an arrow in the Y-axis direction, and FIG. 28 is a view illustrating a folded state of the display device 1000 of FIG. 27.

As illustrated in FIGS. 26 to 28, the display device 1000 in an exemplary embodiment may include a third protection portion 203.

As illustrated in FIGS. 26 and 27, when the panel support portion 100 is fully unfolded, the third protection portion 203 may be connected to the third support portion 103 disposed at another outermost position of the panel support portion 100 among the plurality of support portions. In such an exemplary embodiment, the third protection portion 203 may be rotatably connected to the third support portion 103. In an exemplary embodiment, when one surface of the third support portion 103, connected to the second hinge portion 152, is defined as a first side surface, and another surface of the third support portion 103 that faces the first side surface of the third support portion 103 is defined as a second side surface, the third protection portion 203 may be rotatably connected to the second side surface of the third support portion 103, for example.

The third support portion 103 may include a third connection portion 33 and a fourth connection portion 34 protruding from the second side surface of the third support portion 103 toward the third protection portion 203. The third protection portion 203 may be connected to the third connection portion 33 and the fourth connection portion 34 through a connection shaft 303. Third connection portion 33 and the fourth connection portion 34 have through holes 10 and 20, respectively. The through hole 10 of the third connection portion 33 and the through hole 20 of the fourth connection portion 34 may face each other in the Y-axis direction. The through hole 10 of the third connection portion 33 penetrates the third connection portion 33 in the Y-axis direction, and the through hole 20 of the fourth connection portion 34 penetrates the fourth connection portion 34 in the Y-axis direction.

The third protection portion 203 may include, for example, a protection plate 203a and an extension portion 203b extending from the protection plate 203a. The extension portion 203b may be disposed between the third connection portion 33 and the fourth connection portion 34. The extension portion 203b of the third protection portion 203 has a through hole 30. The through hole 30 of the third protection portion 203 penetrates the third protection portion 203 in the Y-axis direction. The aforementioned connection shaft 303 is inserted into the through hole 10 of the third connection portion 33, the through hole 30 of the third protection portion 203, and the through hole 20 of the fourth connection portion 34. The third protection portion 203 is rotatably coupled to the connection shaft 303.

In an exemplary embodiment, the third protection portion 203 may include, for example, a transparent material.

The third protection portion 203 may protect the first hinge portion 151 and the display panel portion (e.g., the first curved portion 900a of the display panel) on the first hinge portion 151.

As illustrated in FIG. 27, the third protection portion 203 and the third support portion 103 may define a predetermined angle θ3. In an exemplary embodiment, the angle θ3 between the third protection portion 203 and the third support portion 103 may be in a range from about 90 degrees to about 180 degrees, for example. In other words, the angle θ3 defined between the inner side surface 203c of the third protection portion 203 and the rear surface 112 of the third support portion 103 may be in a range from about 90 degrees to about 180 degrees. In another exemplary embodiment, the angle θ3 between the third protection portion 203 and the third support portion 103 may be in a range from about 80 degrees to about 190 degrees.

A rotation shaft of the third support portion 203 may be substantially parallel to at least one of a rotation shaft of the first hinge portion 151 and a rotation shaft of the second hinge portion 152.

In a state illustrated in FIG. 27, when the second support portion 102 rotates about 180 degrees toward the support surface 111 of the first support portion 101, and the third support portion 103 rotates about 180 degrees toward the rear surface 112 of the second support portion 102, the support portions 101, 102, and 103 may be disposed along the Z-axis direction (e.g., the vertical direction), as illustrated in FIG. 28. When the display device 1000 is folded as illustrated in FIG. 28, the second support portion 102 may be disposed on the first support portion 101, and the third support portion 103 may be disposed on the second support portion 102. In such an exemplary embodiment, the support surface 111 of the first support portion 101 and the support surface 111 of the second support portion 102 may face each other, and the rear surface 112 of the second support portion 102 and the rear surface 112 and the third support portion 103 may face each other. When the panel support portion 100 is folded in such a manner, the display panel 900 on the panel support portion 100 is also kept in the folded state. In an exemplary embodiment, the display panel portion on the first hinge portion 151 and the display panel portion on the second hinge portion are curved, for example. In other words, the first curved portion 900a of the display panel 900 is disposed on the first hinge portion 151, and the second curved portion 900b of the display panel 900 is disposed on the second hinge portion 152.

As illustrated in FIG. 28, the third protection portion 203 may rotate 90 degrees toward the rear surface 112 of the third support portion 103. In such an exemplary embodiment, the third protection portion 203 is disposed in a perpendicular direction with respect to the rear surface 112 of the third support portion 103. In other words, the third protection portion 203 may have a shape protruding along a direction opposite to the Z-axis direction (hereinafter, a "−Z-axis direction").

The third protection portion 203 protruding in the −Z-axis direction faces the first hinge portion 151 and the first curved portion 900a of the display panel 900 in the X-axis direction. Accordingly, the first hinge portion 151 and the first curved portion 900a of the display panel 900 may be disposed between a side surface of the panel support portion 100 (e.g., a side surface of the second support portion 102 and a side surface of the first support portion 101) and the third protection portion 203. Accordingly, the first hinge portion 151 and the first curved portion 900a of the display panel 900 may be protected by the third protection portion 203.

Although not illustrated, at least one of the buffer portion 400, the auxiliary display panel 110, the mode determination sensor 510, the fingerprint sensor 520, and the physical manipulation unit 530 described above may be disposed at the inner side surface 203c of the third protection portion 203. In addition, at least one of the imaging unit 540, the lighting unit 550, the position determination sensor 560, and the fingerprint sensor 520 described above may be disposed at an outer side surface 203d of the third protection portion 203. In addition, at least one of the buffer portion 400, the auxiliary display panel 110, the mode determination sensor 510, the fingerprint sensor 520, and the physical manipulation unit 530 described above may be disposed at the outer side surface 203d of the third protection portion 203. In addition, at least one of the imaging unit 540, the lighting unit 550, the position determination sensor 560, and the fingerprint sensor 520 described above may be disposed at the inner side surface 203c of the third protection portion 203.

In addition, the third protection portion 203 may have a shape substantially the same as a shape of the first protection portion 201 of FIGS. 24AA and 24B described above.

In an exemplary embodiment, the angle between the third protection portion 203 and the third support portion 103 may be fixed at about 90 degrees. In such an exemplary embodiment, the third protection portion 203 may be connected to the third support portion 103 in a fixed state. In an exemplary embodiment, the third protection portion 203 may have a shape protruding from one edge of the third support portion 103, for example.

Figure 29:
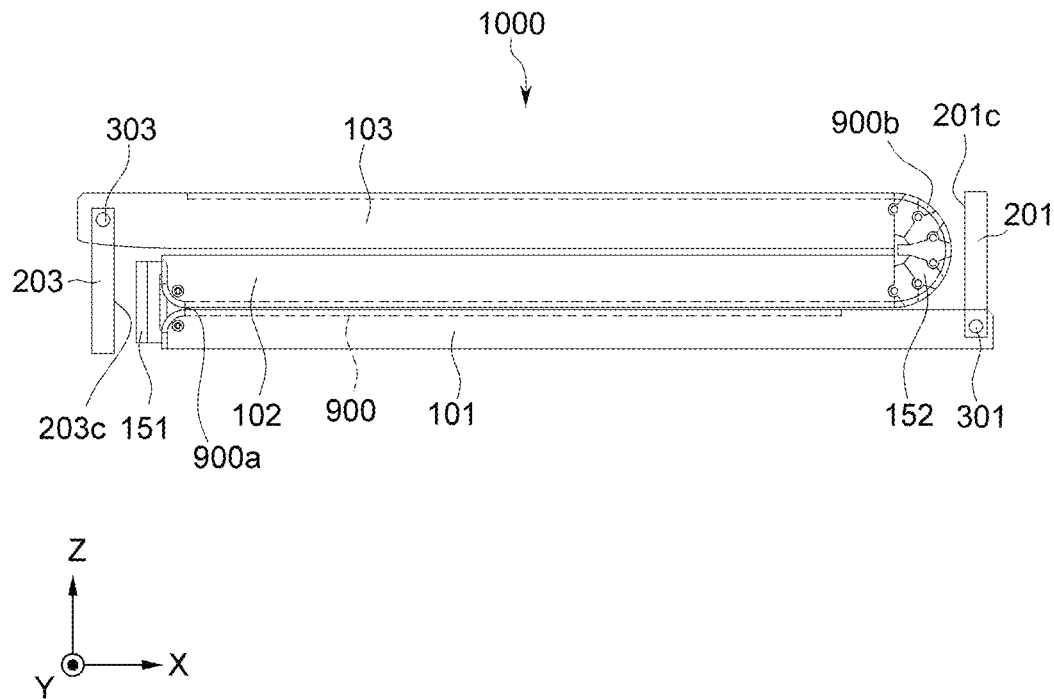
FIG. 29 is a view illustrating another exemplary embodiment of a display device.

FIG. 29 is a view illustrating another exemplary embodiment of the display device 1000.

As illustrated in FIG. 29, the display device 1000 may include the first protection portion 201 and the third protection portion 203 described above.

Since the first protection portion 201 and the third protection portion 203 of FIG. 29 are substantially the same as the first protection portion 201 of FIG. 1 and the third protection portion 203 of FIG. 26, respectively, the description of the protection portion 201 will refer to the description on the first protection portion 201 of FIG. 1, and the description of the third protection portion 203 of FIG. 29 will refer to the description on the third protection portion 203 of FIG. 26.

Figure 30:
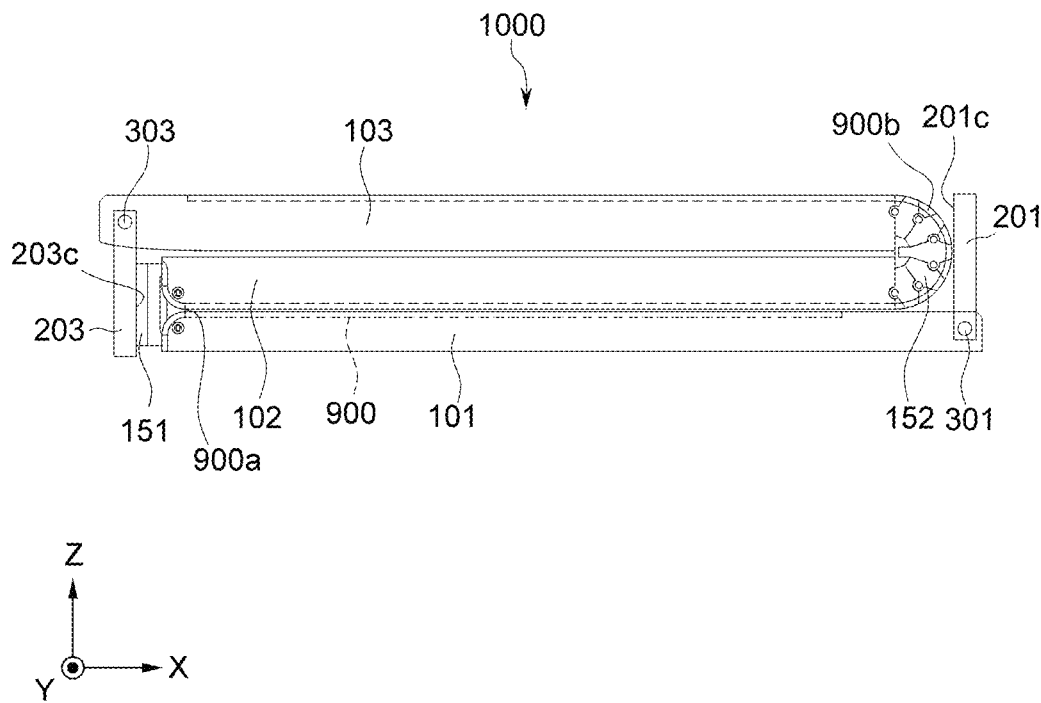
FIG. 30 is a view illustrating another exemplary embodiment of a display device.

FIG. 30 is a view illustrating another exemplary embodiment of the display device 1000.

As illustrated in FIG. 30, the display device 1000 may include the first protection portion 201 and the third protection portion 203 described above.

The first protection portion 201 and the third protection portion 203 of FIG. 30 are substantially the same as the first protection portion 201 of FIG. 1 and the third protection portion 203 of FIG. 26 described above.

In such an exemplary embodiment, the first protection portion 201 may contact the second hinge portion 152 and the display surface 991 of the second hinge portion 152 of the display panel 110 disposed on the second hinge portion 152.

In addition, the third protection portion 203 may contact the first hinge portion 151.

FIG. 31 is a view illustrating another exemplary embodiment of a display device. Specifically, FIG. 31 illustrates another exemplary embodiment of the first protection portion.

As illustrated in FIG. 31, a first protection portion 241 includes a protection plate 70, a first extension portion 71, a second extension portion 72, a first rotation shaft 81, and a second rotation shaft 82.

The first extension portion 71 extends in a −X-axis direction from one edge of the protection plate 70. The first extension portion 71 has a through hole 41 penetrating the first extension portion 71 in the Y-axis direction.

The second extension portion 72 extends in the −X-axis direction from another edge of the protection plate 70. The second extension portion 72 has a through hole 42 penetrating the second extension portion 72 in the Y-axis direction.

The first rotation shaft 81 passes through the through hole 41 of the first extension portion 71 and is coupled to a recess 91 of the first support portion 101. The recess 91 of the first support portion 101 is disposed at a third coupling portion 33 of the first support portion 101.

The second rotation shaft 82 passes through the through hole 42 of the second extension portion 72 and is coupled to a recess 92 of the first support portion 101. The recess 92 of the first support portion 101 is disposed at a fourth coupling portion 34 of the first support portion 101.

As set forth hereinabove, the display device according to one or more exemplary embodiments provides the following effects.

The display device according to one or more exemplary embodiments includes a protection portion connected to a panel support portion. The protection portion may protect the curved portion of the display panel that is folded. Accordingly, damage to the display panel may be substantially prevented.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. A display device comprising:
a panel support portion comprising a plurality of support portions rotatably connected to each other;
a flexible display panel on a first surface of the panel support portion; and
a first protection portion rotatably connected to a side of the panel support portion,
wherein the first protection portion does not contact a non-display surface of the flexible display panel.

2. The display device of claim 1, wherein the first protection portion comprises:
a protection plate;
a first extension portion extending from a first edge of the protection plate and disposed outside a first connection portion of the first support portion; and
a second extension portion extending from a second edge of the protection plate and disposed outside a second connection portion of the first support portion, and
the protection plate and the first extension portion are connected to each other by a first rotation shaft, and the protection plate and the second extension portion are connected to each other by a second rotation shaft.

3. The display device of claim 1, further comprising an auxiliary display panel on at least one of an inner side surface and an outer side surface of the first protection portion.

4. The display device of claim 1, further comprising an imaging unit on at least one of an inner side surface and an outer side surface of the first protection portion.

5. The display device of claim 1, further comprising a lighting unit on at least one of an inner side surface and an outer side surface of the first protection portion.

6. A device comprising:
a panel support portion comprising a plurality of support portions rotatably connected to each other;
a flexible display panel on a first surface of the panel support portion; and
a first protection portion rotatably connected to a side of the panel support portion,
wherein the plurality of support portions comprises:
a first support portion rotatably connected to the first protection portion;
a second support portion rotatably connected to the first support portion; and
a third support portion rotatably connected to the second support portion.

7. The display device of claim 6, wherein the first protection portion is connected to the first support portion in a rotatable manner by a degree in a range from about 80 degrees to about 190 degrees.

8. The display device of claim 7, wherein when an angle between the first protection portion and the first support portion is less than about 180 degrees, the first protection portion faces a display surface of the flexible display panel between the second support portion and the third support portion.

9. The display device of claim 6, wherein a rotation shaft of the first protection portion is substantially parallel to a rotation shaft between the first support portion and the second support portion.

10. The display device of claim 6, wherein a rotation shaft between the first support portion and the second support portion is substantially parallel to a rotation shaft between the second support portion and the third support portion.

11. The display device of claim 6, wherein the first support portion and the second support portion rotate such that a first surface of the first support portion and a second surface of the second support portion face each other.

12. The display device of claim 6, wherein the second support portion and the third support portion rotate such that a second surface of the second support portion and a second surface of the third support portion face each other, or such that a first surface of the second support portion and a first surface of the third support portion face each other.

13. The display device of claim 6, wherein a first edge of first and second edges, facing each other, of the first support portion is rotatably connected to the second support portion, and the second edge is rotatably connected to the first protection portion.

14. The display device of claim 13, wherein the first protection portion extends along the second edge.

15. The display device of claim 6, wherein the first protection portion has a thickness which increases, as further away from the first support portion.

16. The display device of claim 15, wherein a surface of the first support portion has a rounded shape.

17. The display device of claim 16, wherein at least a part of a surface of the first protection portion has a curvature substantially the same as a curvature of a curved portion of the flexible display panel.

18. The display device of claim 16, wherein when an angle between the first protection portion and the first support portion is about 90 degrees, the first protection portion does not expose a curved portion of the flexible display panel.

19. The display device of claim 6, wherein when an angle between the first protection portion and the first support portion is about 90 degrees, the first protection portion contacts a curved portion of the flexible display panel.

20. The display device of claim 6, wherein the first protection portion comprises:
a protection plate; and
an extension portion extending from the protection plate and disposed between a first connection portion and a second connection portion of the first support portion, and
the protection plate, the first connection portion and the second connection portion are connected to each other by a rotation shaft.

21. The display device of claim 6, further comprising a second protection portion rotatably connected to the first protection portion.

22. The display device of claim 21, wherein the second protection portion is disposed on the third support portion.

23. The display device of claim 21, wherein the second protection portion comprises a transparent or translucent material.

24. The display device of claim 6, further comprising a third protection portion rotatably connected to the third support portion.

25. The display device of claim 24, wherein an angle between an inner side surface of the third protection portion and a rear surface of the third support portion is in a range from about 80 degrees to about 190 degrees.

26. The display device of claim 6, further comprising a first hinge portion connecting the first support portion and the second support portion.

27. The display device of claim 26, wherein the first hinge portion comprises:
a first plate;
a first coupling portion protruding from a first edge of the first plate, and connected to a first connection portion of the first support portion and a first connection portion of the second support portion; and
a second coupling portion protruding from a second edge of the first plate, and connected to a second connection portion of the first support portion and a second connection portion of the second support portion.

28. The display device of claim 27, wherein the first coupling portion comprises:
a first rotation shaft connected to the first connection portion of the first support portion;
a second rotation shaft connected to the first connection portion of the second support portion; and
a plurality of gears connected to the first rotation shaft and the second rotation shaft.

29. The display device of claim 28, wherein the second coupling portion comprises:
a third rotation shaft connected to the second connection portion of the first support portion;
a fourth rotation shaft connected to the second connection portion of the second support portion; and
a plurality of gears connected to the third rotation shaft and the fourth rotation shaft.

30. The display device of claim 6, further comprising:
a second hinge portion connecting the second support portion and the third support portion.

31. The display device of claim 30, wherein the second hinge portion comprises a plurality of joint portions hingedly coupled between the second support portion and the third support portion.

32. A display device comprising:
a panel support portion comprising a plurality of support portions rotatably connected to each other;
a flexible display panel on a first surface of the panel support portion; and
a first protection portion rotatably connected to a side of the panel support portion,
wherein the first protection portion comprises a transparent material.

33. A display device comprising:
a panel support portion comprising a plurality of support portions rotatably connected to each other;
a flexible display panel on a first surface of the panel support portion; and
a first protection portion rotatably connected to a side of the panel support portion,
a buffer portion at an inner side surface of the first protection portion.

34. The display device of claim 33, wherein the buffer portion is disposed over an entire surface of the inner side surface of the first protection portion.

35. The display device of claim 33, wherein the buffer portion is disposed at opposite edges of the inner side surface of the first protection portion.

36. A display device comprising:
a panel support portion comprising a plurality of support portions rotatably connected to each other;
a flexible display panel on a first surface of the panel support portion; and
a first protection portion rotatably connected to a side of the panel support portion,
a mode determination sensor on at least one of an inner side surface and an outer side surface of the first protection portion.

37. A display device comprising:
a panel support portion comprising a plurality of support portions rotatably connected to each other;
a flexible display panel on a first surface of the panel support portion; and
a first protection portion rotatably connected to a side of the panel support portion,
a fingerprint sensor disposed on at least one of an inner side surface and an outer side surface of the first protection portion.

38. A display device comprising:
a panel support portion comprising a plurality of support portions rotatably connected to each other;
a flexible display panel on a first surface of the panel support portion; and
a first protection portion rotatably connected to a side of the panel support portion,
a physical manipulation unit on at least one of an inner side surface and an outer side surface of the first protection portion.

39. A display device comprising:
a panel support portion comprising a first support portion, a second support portion rotatably connected to the first support portion, and a third support portion rotatably connected to the second support portion;

a flexible display panel on the panel support portion; and a protection portion rotatably connected to the first support portion.

40. The display device of claim 39, wherein the protection portion does not contact a non-display surface of the flexible display panel.

41. The display device of claim 39, wherein the protection portion is connected to the first support portion in a rotatable manner by a degree in a range from about 80 degrees to about 190 degrees.

42. The display device of claim 41, wherein when an angle between the protection portion and the first support portion is less than about 180 degrees, the protection portion faces a display surface of the flexible display panel between the second support portion and the third support portion.

43. A display device comprising:

a panel support portion comprising 'n' number of support portions of which adjacent ones are connected to each other where 'n' is a natural number greater than two;

a flexible display panel on the panel support portion; and a protection portion rotatably connected to a support portion which is disposed at an outermost position among the 'n' number of support portions.

44. The display device of claim 43, wherein the protection portion does not contact a non-display surface of the flexible display panel.

\* \* \* \* \*